US010725142B2

(12) United States Patent
Feineman

(10) Patent No.: US 10,725,142 B2
(45) Date of Patent: Jul. 28, 2020

(54) SINGLE CHANNEL INTERFEROMETER WITH OPTICAL DELAY LINES

(71) Applicant: Cobham Advanced Electronic Solutions, Inc., Lansdale, PA (US)

(72) Inventor: Arnold N. Feineman, Doylestown, PA (US)

(73) Assignee: Cobham Advanced Electronic Solutions, Inc., Lansdale, PA (US)

( * ) Notice: Subject to any disclaimer, the term of this patent is extended or adjusted under 35 U.S.C. 154(b) by 530 days.

(21) Appl. No.: 15/422,336

(22) Filed: Feb. 1, 2017

(65) Prior Publication Data

US 2018/0217222 A1    Aug. 2, 2018

(51) Int. Cl.
| | | |
|---|---|---|
| *G01S 5/04* | (2006.01) | |
| *G01S 3/48* | (2006.01) | |
| *G01S 3/74* | (2006.01) | |
| *G01S 3/04* | (2006.01) | |
| G01S 3/46 | (2006.01) | |
| G01S 3/50 | (2006.01) | |

(52) U.S. Cl.
CPC ............... *G01S 3/48* (2013.01); *G01S 3/043* (2013.01); *G01S 3/74* (2013.01); *G01S 3/46* (2013.01); *G01S 3/50* (2013.01)

(58) Field of Classification Search
CPC ..... G01S 3/48; G01S 3/74; G01S 3/72; G01S 3/46; G01S 3/50
USPC ........................................ 342/442, 445, 417
See application file for complete search history.

(56) References Cited

U.S. PATENT DOCUMENTS

| | | | | |
|---|---|---|---|---|
| 4,736,463 | A | * 4/1988 | Chavez | ................ H01Q 3/2676 359/107 |
| 5,457,466 | A | 10/1995 | Rose | |
| 5,936,575 | A | * 8/1999 | Azzarelli | .................. G01S 3/06 342/362 |

(Continued)

OTHER PUBLICATIONS

Godby, George, "Using GNU Radio for Signal Phase Measurements," ECE 480 Senior Design, Mar. 27, 2014, 12 pgs.

(Continued)

*Primary Examiner* — Chuong P Nguyen
(74) *Attorney, Agent, or Firm* — Morgan, Lewis & Bockius LLP

(57) ABSTRACT

Systems and methods are provided in which a direction of arrival of a radio frequency (RF) signal received by a plurality of antennas is determined. A plurality of first converter receives RF signals from the plurality of antennas and outputs a minimum of a first optical signal and a second optical signal each modulated by their corresponding RF signal. A plurality of second converters receives a minimum of the first optical signal via a first optical channel that introduces a first delay and the second optical signal via a second optical channel that introduces a second delay. The second converter outputs a first RF signal that corresponds to the RF modulation on the first optical signal and a second RF signal that corresponds to the RF modulation on the second optical signal. A switch serially receives, from the second converter outputs, the first RF signal and the second RF signal. A direction finding subsystem determines a direction of arrival using a phase difference between the first RF signal and the second RF signal.

23 Claims, 17 Drawing Sheets

(56) References Cited

U.S. PATENT DOCUMENTS

| | | | | |
|---|---|---|---|---|
| 7,555,217 | B2* | 6/2009 | Hillis | B82Y 20/00 398/115 |
| 7,692,586 | B2* | 4/2010 | Straatveit | H01Q 21/29 342/424 |
| 9,590,740 | B1* | 3/2017 | Pace | G01S 3/48 |
| 9,966,661 | B2* | 5/2018 | Xue | H01Q 3/34 |
| 10,082,382 | B2* | 9/2018 | Schmitt | G02B 27/1006 |
| 10,313,012 | B2* | 6/2019 | Murakowski | H04B 10/69 |
| 10,564,249 | B2* | 2/2020 | Djerafi | G01S 3/32 |
| 2005/0195103 | A1* | 9/2005 | Davis | G01S 3/74 342/99 |
| 2006/0210279 | A1* | 9/2006 | Hillis | B82Y 20/00 398/118 |
| 2009/0111483 | A1* | 4/2009 | Fiereizen | G01S 1/08 455/456.1 |
| 2012/0140236 | A1* | 6/2012 | Babbitt | G01S 3/043 356/451 |
| 2019/0212408 | A1* | 7/2019 | Lam | G01S 3/043 |

OTHER PUBLICATIONS

Harter, Nathan M., "Development of a Single-Channel Direction Finding Algorithm," Thesis, Polytechnic Institue and State University, Apr. 13, 2007, 118 pgs.

Lipsky, "Microwave Passive Direction Finding," Copyright © 1987 by John Wiley & Sons, Inc., 10 pgs.

Miller, Paul, "Study of Feasability for Phase Difference Extraction Using Software Defined Radio in Location Analysis," Master's Theses, Paper 176, Western Michigan University, Jun. 2013, 95 pgs.

Pace, et al., "High-Resolution Phase Sampled Interferometry Using Symmetrical Number Systems," IEEE Transactions on Antennas and Propagation, vol. 49, No. 10, Oct. 2001, 14 pgs.

Peavy, et al., "The Single Channel Interferometer Using a Pseudo-Doppler Direction Finding System," Copyright 1997 IEEE, 4 pgs.

Tsui, Digital Techniques for Wideband Receivers, © 1995 Artech House, Inc., 17 pgs.

* cited by examiner

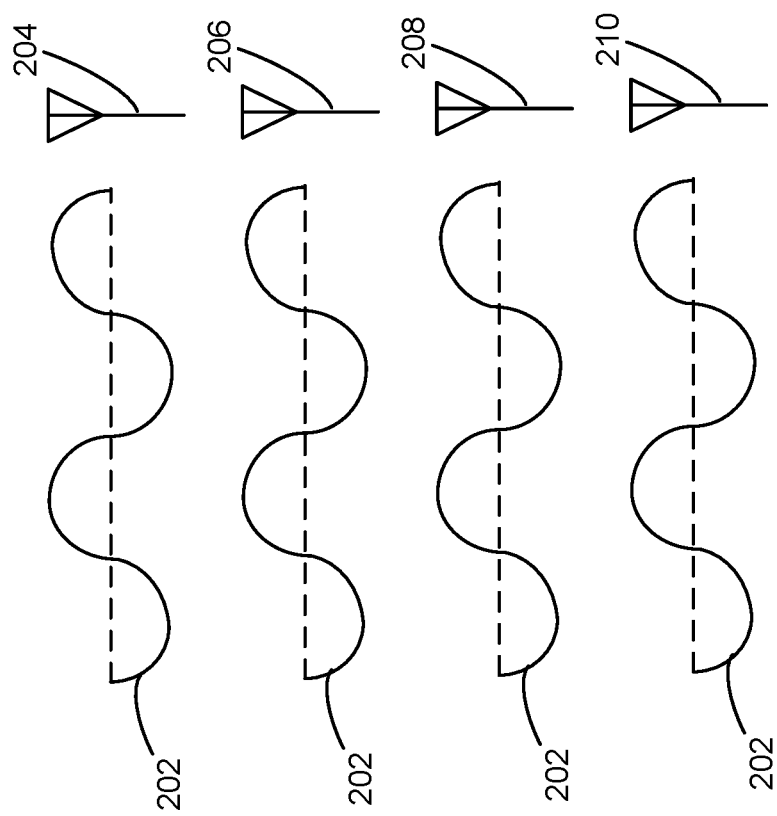
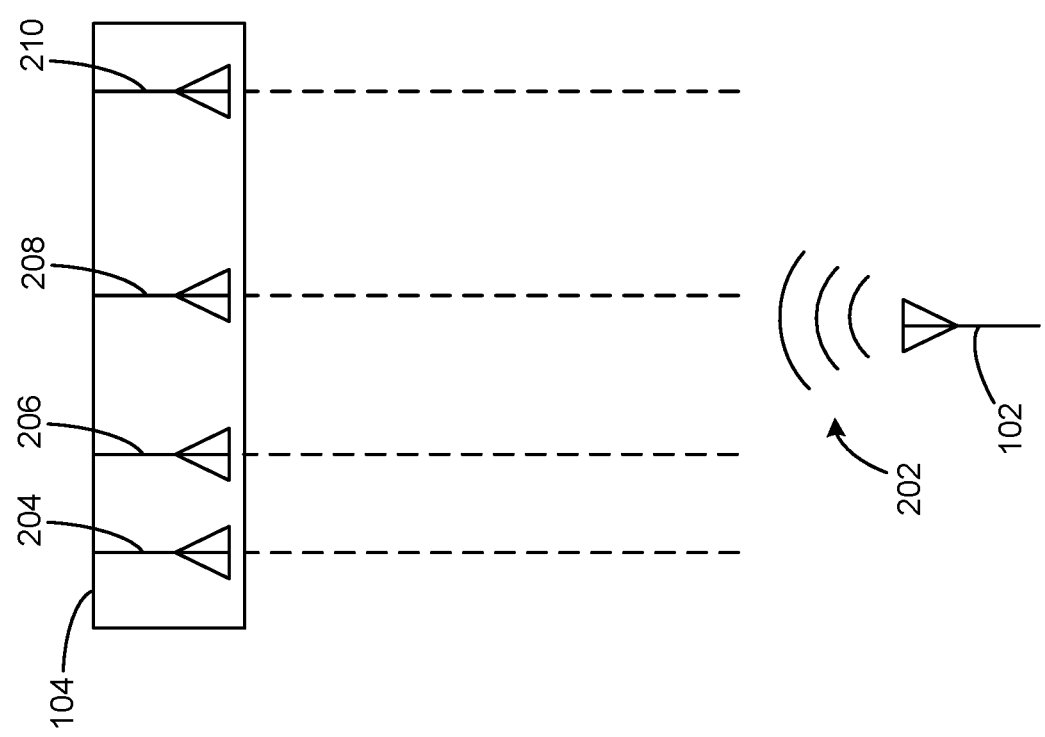
Figure 2B
Figure 2A

1000

1048
Electronically coupling the first switch to the second RF signal output of the second converter to receive the second RF signal occurs a predetermined amount of time after electronically coupling the first switch to the first RF signal output of the second converter to receive the first RF signal

1050
Receive, by a second switch that is communicatively coupled to the direction finding subsystem, the first RF signal

1052
Output, by the second switch, the first RF signal

1054
After the predetermined amount of time, receive, by the second switch, the second RF signal

1056
Output, by the second switch, the second RF signal

1058
Apply, by a delay device, a delay to the first RF signal

1060
The delay device includes optical fiber

Ⓓ

1062
Apply, by a digital delay device, a delay to a reference signal generated by a reference signal generator; and wherein the phase difference between the first RF signal and the second RF signal is determined using: a phase difference between the first RF signal and the reference signal, and a phase difference between the second RF signal and the delayed reference signal

Ⓓ

1064
Store, by a memory device, a digitized representation of the first RF signal output of the second switch; and store, by the memory device, a digitized representation of the second RF signal output of the second switch, wherein a digital delay is applied to the second RF signal stored by the memory device

1102
Receive, by a plurality of radio frequency (RF) antennas including a first antenna and a second antenna, an RF signal

1104
Output, by the plurality of RF antennas, a plurality of antenna signals including a first antenna signal and a second antenna signal

1106
Receive, by a first converter that is electrically coupled to the plurality of RF antennas, the second antenna signal

1108
Output, by the first converter, an optical signal converted from the second antenna signal

1110
Receive, by a second converter, the optical signal, wherein the optical signal is received via an optical channel that introduces a delay that is proportional to the length of the optical channel

1112
Output, by an RF signal output of the second converter, an optically delayed RF signal that corresponds to the second antenna

1114
Electronically couple a first switch to a first output of the first antenna to receive the first antenna signal (A)

Figure 11A

SINGLE CHANNEL INTERFEROMETER WITH OPTICAL DELAY LINES

TECHNICAL FIELD

The disclosed embodiments relate generally to a radio frequency (RF) interferometer for determining direction of arrival of a received signal, and in particular, to techniques for applying a delay to the output of at least one interferometer antenna element using an optical delay line.

BACKGROUND

Multi-antenna interferometers determine a direction of arrival of a signal using a difference between a phase of the signal as received by a reference antenna and a phase of the signal as received by at least one other antenna. Many interferometers perform phase detection using phase data received via parallel channels. Transmitting phase data via a single channel rather than parallel channels is beneficial in various situations, such as when the interferometer is installed in an existing system (e.g., retrofitted in an aircraft). Transmitting interferometer data via a single channel potentially reduces the size, weight, power, and cost requirements of interferometer electronics and direction finding systems.

SUMMARY

There is a need for systems and methods for determining a direction of arrival of a radio frequency (RF) signal using a single, time multiplexed receiver channel that uses true time delays to normalize and synchronize the measurements of multiple antennas to the same instant in time. Such systems and methods are capable of determining direction of arrival of RF signals by an interferometer pulsed or continuous RF waveforms while enabling data transfer from the measurement subsystem of the interferometer to the direction finding subsystem of the interferometer via a single channel.

An interferometer using a receiver in each channel requires that the receivers be matched or calibrated closely in phase to one another. The multiple receiver channels allow all antenna phase differences to be calculated at the same instant in time, so the relative phases are not impacted by platform motion between measurements. In the single channel interferometer, the antennas are sampled sequentially which could introduce errors if not compensated by adding time delays through progressively longer length transmission lines. Receiver phase matching is inherent in the single channel interferometer, as there is only one receiver channel. Interferometer receivers typically use a relatively narrow bandwidth to ensure that only the signal of interest is being measured; as a result, relatively long time delays are needed to allow the sampled signals to reach their steady state value. Conventional transmission line techniques for achieving long delays are large, heavy, have high RF losses above 3 GHz, and are subject to phase and delay changes due to temperature changes. The novel application of optical delay lines enables the practical implementation of a single channel interferometer at frequencies above 3 GHz and can also be used to improve interferometers operating at frequencies below 3 GHz.

In some embodiments, a method for determining a direction of arrival of a RF signal includes receiving, by a plurality of RF antennas including a first antenna and a second antenna, an RF signal. The plurality of RF antennas output a plurality of antenna signals including a first antenna signal and a second antenna signal. A first converter that is electrically coupled to the plurality of RF antennas receives the plurality of antenna signals including the first antenna signal and the second antenna signal. The first converter outputs a plurality of optical signals, including a first optical signal converted from the first antenna signal and a second optical signal converted from the second antenna signal. A second converter receives the plurality of optical signals, wherein: the first optical signal of the plurality of optical signals is received by the second converter from the first converter via a first optical channel with a first length, wherein the first optical channel introduces a first delay that is proportional to the length of the first optical channel, and the second optical signal of the plurality of optical signals is received via a second optical channel with a second length that is longer than the first length, wherein the second optical channel introduces a second delay that is proportional to the length of the second optical channel. The second converter outputs a plurality of RF signals, including: outputting, via a first RF signal output of the second converter, a first RF signal that corresponds to the delayed first optical signal, and outputting, via a second RF signal output of the second converter, a second RF signal that corresponds to the delayed second optical signal. A first switch electronically couples to the first RF signal output of the second converter to receive the first RF signal, and after receiving the first RF signal, the first switch electronically couples to the second RF signal output of the second converter to receive the second RF signal. A direction finding subsystem communicatively coupled to the first switch receives the first RF signal and the second RF signal. The direction finding subsystem determines a direction of arrival of the RF signal received by the plurality of antennas using a phase difference between the first RF signal and the second RF signal.

In some embodiments, an interferometer comprises a plurality of RF antennas including a first antenna and a second antenna. The plurality of RF antennas are configured to receive an RF signal and output a plurality of antenna signals including a first antenna signal output by the first antenna and a second antenna signal output by the second antenna. The interferometer also comprises a first converter electrically coupled to the plurality of RF antennas, the first converter configured to receive the plurality of antenna signals including the first antenna signal and the second antenna signal and output a plurality of optical signals including a first optical signal converted from the first antenna signal and a second optical signal converted from the second antenna signal. The interferometer further comprises a second converter configured to receive the plurality of optical signals and output a plurality of RF signals including a first RF signal that corresponds to the first optical signal and a second RF signal that corresponds to the second optical signal. The interferometer also comprises a first optical channel that is optically coupled to the first converter and the second converter, wherein the first optical channel: has a first length, and introduces a first delay that is proportional to the first length of the first optical channel; and a second optical channel that is optically coupled to the first converter and the second converter, wherein the second optical channel has: a second length that is longer than the first length, and introduces a second delay that is proportional to the length of the second optical channel. The interferometer additionally comprises a first switch configured to: electronically couple to a first RF signal output of the second converter to receive the first RF signal, and after receiving the first RF signal, electronically couple to the second RF signal output of the second converter to receive the second RF signal. The interferometer also comprises a direction finding subsystem communicatively coupled to the output of the first switch, the direction finding subsystem configured to: receive the first RF signal and the second RF signal, and determine a direction of arrival of the RF signal received by the plurality of antennas using a phase difference between the first RF signal and the second RF signal.

In some embodiments, a method for determining a direction of arrival of an RF signal includes receiving, by a plurality of RF antennas including a first antenna and a second antenna, an RF signal. The plurality of antennas output a plurality of antenna signals including a first antenna signal and a second antenna signal. A first converter that is electrically coupled to the plurality of RF antennas receives the second antenna signal. The first converter outputs an optical signal converted from the second antenna signal. A second converter receives the optical signal via an optical channel that introduces a delay proportional to the length of the optical channel. An RF signal output of the second converter outputs an optically delayed RF signal that corresponds to the second antenna. A first switch electronically couples to a first output of the first antenna to receive the first antenna signal. After receiving the first antenna signal, the first switch electronically couples to the RF signal output of the second converter to receive the optically delayed RF signal that corresponds to the second antenna. A direction finding subsystem communicatively coupled to the first switch receives the first antenna signal and the optically delayed RF signal that corresponds to the second antenna. The direction finding subsystem determines a direction of arrival of the received RF signal using a phase difference between the first antenna signal and the optically delayed RF signal.

BRIEF DESCRIPTION OF THE DRAWINGS

So that the present disclosure can be understood in greater detail, a more particular description may be had by reference to the features of various embodiments, some of which are illustrated in the appended drawings. The appended drawings, however, merely illustrate pertinent features of the present disclosure and are therefore not to be considered limiting, for the description may admit to other effective features.

FIGS. 2A-2B illustrate use of an array of antennas of an interferometer to determine direction of arrival of a signal transmitted by a signal transmitter when the signal transmitter is at a first position relative to an interferometer, in accordance with some embodiments.

FIGS. 10A-10F are flow diagrams illustrating a method for determining a direction of arrival of an RF signal, in accordance with some embodiments.

FIGS. 11A-11B are flow diagrams illustrating a method for determining a direction of arrival of an RF signal, in accordance with some embodiments.

DETAILED DESCRIPTION

Numerous details are described herein in order to provide a thorough understanding of the example embodiments illustrated in the accompanying drawings. However, some embodiments may be practiced without many of the specific details, and the scope of the claims is only limited by those features and aspects specifically recited in the claims. Furthermore, well-known processes, components, and materials have not been described in exhaustive detail so as not to unnecessarily obscure pertinent aspects of the embodiments described herein.

Figure 1:
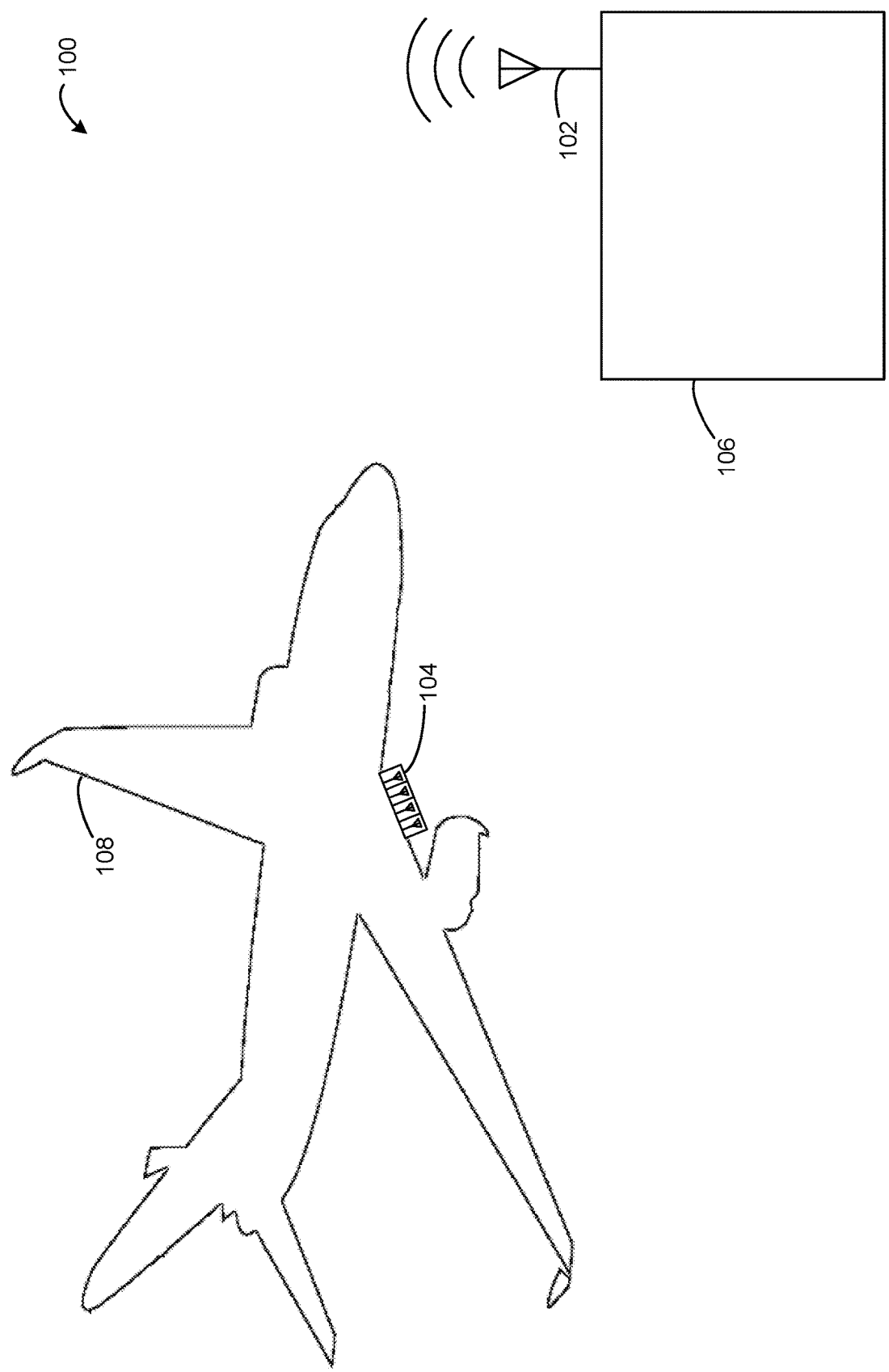
FIG. 1 illustrates an aircraft operation environment for an interferometer, in accordance with some embodiments.

FIG. 1 illustrates an aircraft operation environment 100, in accordance with some embodiments. Aircraft operation environment 100 includes a signal transmitter 102 and an interferometer 104. In the illustrative example shown in FIG. 1, signal transmitter 102 is a static, ground based radar (e.g., mounted to a building 106) and interferometer 104 is mounted to an aircraft 108. Aircraft 108 is, e.g., an airplane or other aerial vehicle. Although interferometer 104 is shown as a linear array of multiple antennas in the illustrative example of FIG. 1, different arrangements of antennas can be used for interferometer 104, e.g., as described with regard to FIGS. 4A-4D. Typically, an axis along which at least some of the antennas in interferometer 104 are arranged (e.g., an axis along which antennas in a linear array are arranged) is perpendicular to the direction of travel of the aircraft. For example, the antenna array is located along a leading edge of an aircraft wing, as shown in FIG. 1, or in the nose of the aircraft.

It will be recognized that installation of interferometer 104 in an aircraft is an illustrative example of implementation of the interferometer 104. In some embodiments, interferometer 104 as described herein is implemented in alternative systems, such as any manned or unmanned aircraft, spacecraft, sea craft, ground vehicle, or fixed site installation. It will be recognized that benefits to size, weight, power, and cost of interferometer 104 over existing interferometers is applicable in fixed wing aircraft as well as in alternative systems such as those discussed above.

FIGS. 2A-2B illustrate use of an array of antennas of interferometer 104 to determine direction of arrival of a signal transmitted by signal transmitter 102 when signal transmitter 102 is at a first angular position relative to interferometer 104, in accordance with some embodiments.

In FIG. 2A, signal 202 transmitted by signal transmitter 102 travels the same distance to each of antennas 204, 206, 208 and 210. FIG. 2B illustrates signal 202 arriving at antennas 204-210. While signal 202 is shown as a sine wave (in FIG. 2B) for simplicity of illustration, it will be recognized that different signal types may be used. In FIG. 2B, signal 202 as received by antenna 204 is in phase with signal 202 as received by antennas 206, 208, and 210. An angle of arrival of the signal is determined based on the phase of signal 202 as received at antennas 204-210. As a result of the lack of a difference in phase between signal 202 as received by antenna 204 and signal 202 as received by antennas 206, 208, and 210, an angle of arrival determined from the output of antennas 204, 206, 208, and 210 is zero degrees.

Figures 3A, 3B:
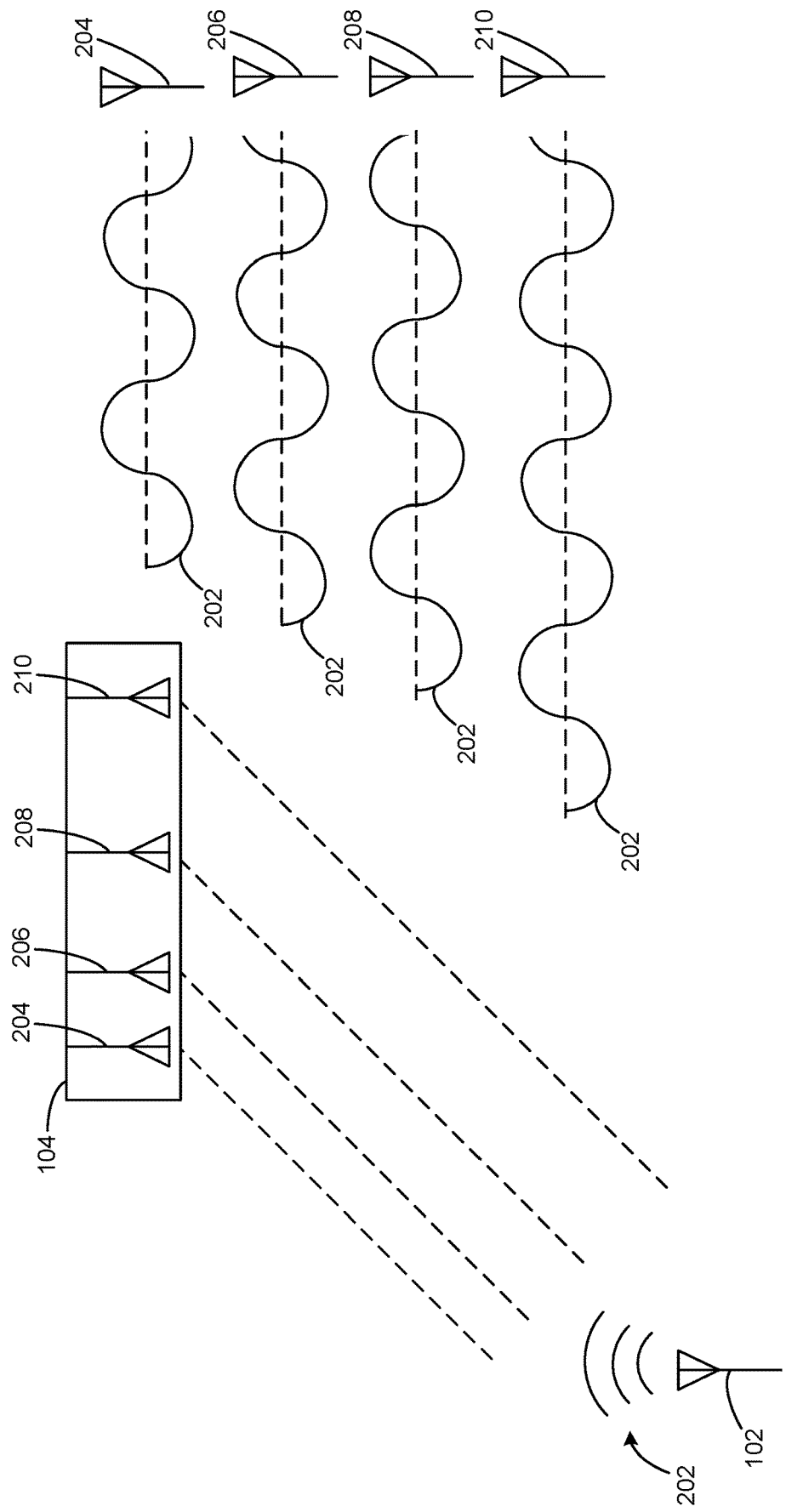
FIGS. 3A-3B illustrate use of an array of antennas of an interferometer to determine direction of arrival of a signal transmitted by a signal transmitter when the signal transmitter is at a second position relative to an interferometer, in accordance with some embodiments.

FIGS. 3A-3B illustrate use of an array of antennas of interferometer 104 to determine direction of arrival of a signal transmitted by signal transmitter 102 when signal transmitter 102 is at a second angular position relative to interferometer 104, in accordance with some embodiments.

In FIG. 3A, signal 202 travels different distances to reach antennas 204, 206, 208, and 210. As a result, as shown in FIG. 3B, signal 202 as received by antenna 204 is out of phase with signal 202 as received by antennas 206, 208, and 210. Based on the phase differences between signal 202 as received at antennas 206-210, an angle of arrival of signal 202 is determined. In the illustrative example of FIGS. 3A-3B, the angle of arrival of signal 202 is 45 degrees.

FIGS. 4A-4D illustrate various configurations of antennas in an antenna array of interferometer 104, in accordance with some embodiments. Typically, antennas in an antenna array of interferometer 104 are phase matched and/or phase calibrated.

Figure 4A:
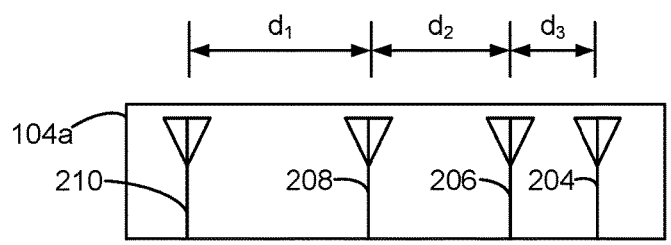
FIGS. 4A-4E illustrate various configurations of antennas in an antenna array of an interferometer, in accordance with some embodiments.

FIG. 4A illustrates an interferometer 104a that includes a linear array of antennas 204, 206, 208, and 210. Typically, antennas in a linear array are arranged such that the distances between adjacent antennas are integer multiples of $\lambda/2$, where $\lambda$ is the wavelength that corresponds to the highest frequency measured by the system. For example, in some embodiments, signal 202 is an RF signal with a frequency in the range 1 GHz to 300 GHz. In some embodiments the RF frequency range is within the UHF (300-3000 MHz) range or lower. In FIG. 4A, the distance $d_3$ between antennas 204 and 206 is $\lambda/2$, the distance $d_2$ between antennas 206 and 208 is $\lambda$, and the distance $d_1$ between antennas 208 and 210 is $2\lambda$. Linear antenna arrays are usable to determine direction (angle) of approach of a signal.

As the wavelength $\lambda$ of signals detected by interferometer 104 decreases, and the wavelength becomes small relative to the rate of movement of the object (e.g., aircraft) to which interferometer 104 is attached, the movement of the object is more likely to introduce errors in phase difference measurements and direction of arrival calculations performed by the interferometer 104. For example, error increases at shorter wavelengths because the aircraft position change between samples corresponds to a larger number of wavelengths, resulting in a larger phase change between samples. Thus, precision time synchronization of the multiplexer switch, delay lines, and demultiplexer is increasingly important as the frequency of the detected signals increases.

Figure 4B:
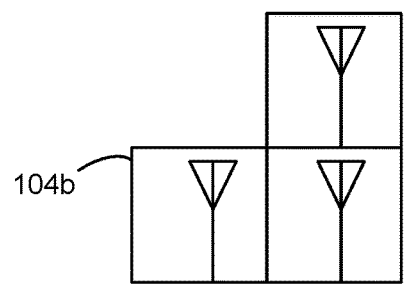

FIG. 4B illustrates an interferometer 104b that includes a planar array of antennas. Planar arrays allow azimuth and elevation angle of a received signal to be determined. Using known information about the location of the platform to which the interferometer 104 is mounted, a planar array of antennas can be used to determine the position of a signal transmitter 102.

Figure 4C:
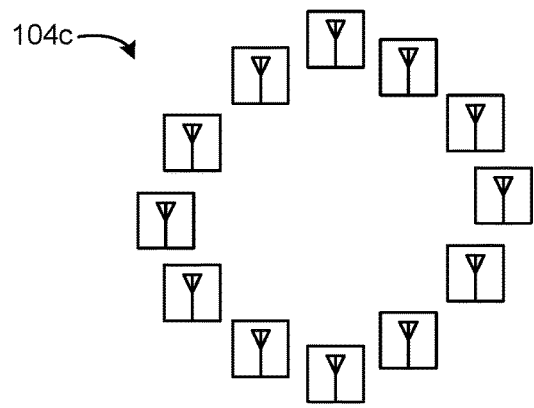

FIG. 4C illustrates an interferometer 104c that includes a circular array of antennas. A circular array of antennas provides a 360° field of view.

Figure 4D:
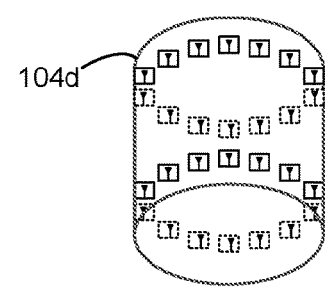

FIG. 4D illustrates an interferometer 104d that includes a cylindrical array of antennas. A cylindrical array of antennas provides an omnidirectional-azimuth field of view and a defined elevation field of view in the orientation shown.

Figure 4E:
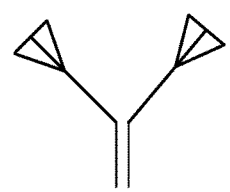

FIG. 4E illustrates an interferometer using two antennas whose boresight directions are offset in angle from one another. The interferometer phase measurement may result in an ambiguous direction of arrival (multiple directions can result in the same phase difference). The ambiguity can be resolved by computing a coarse direction of arrival from the difference in amplitude of the signals between the two antennas.

In some embodiments, interferometer 104 is used to finding a bearing angle (e.g., angle of arrival), direction of arrival, and/or location of an unknown emitter. In some embodiments, interferometer 104 is used to determine a bearing angle, direction of arrival and/or location of a known emitter. For example, by processing bearing angles of signals received from known emitter locations, the interferometer host platform can determine its own location if a GPS signal is not available.

Figure 5:
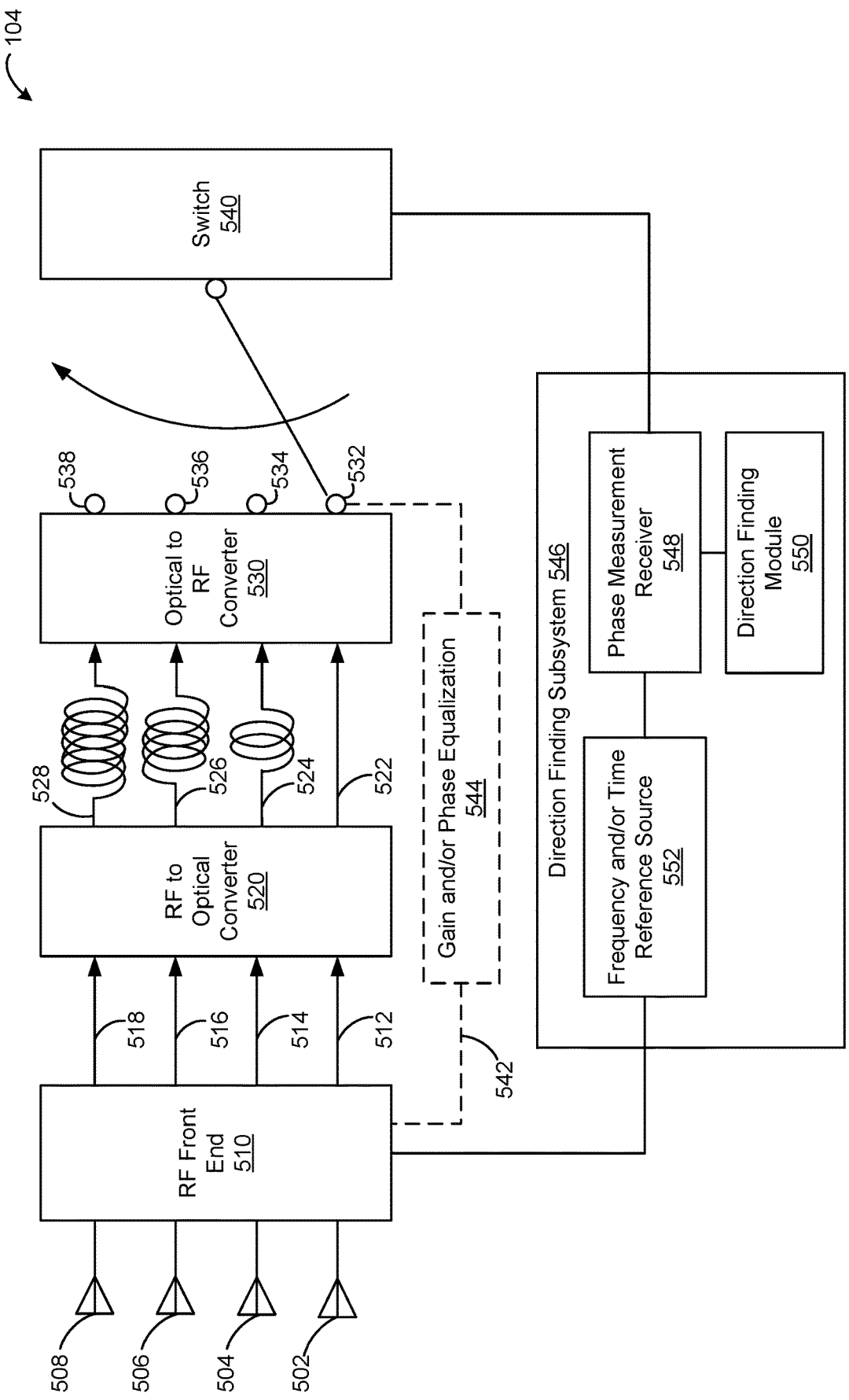
FIG. 5 illustrates a single channel interferometer, in accordance with some embodiments.

FIG. 5 illustrates an interferometer 104, in accordance with some embodiments. Interferometer 104 detects incoming signals using two or more antennas. In the illustrative example of FIG. 5, interferometer 104 includes a measurement subsystem with antennas 502, 504, 506, and 508, RF front end 510, optical to RF converter 530, switch 540, (optionally) gain and/or phase equalization component 544, and connecting channels and/or delays. In some embodiments, antennas 502, 504, 506, and 508, correspond to antennas 204, 206, 208, 210, respectively, of a linear array of antennas as described with regard to FIGS. 1-4A. In some embodiments, antennas 502, 504, 506, and 508 are antennas of a planar array (e.g., as described with regard to FIG. 4B), a circular array (e.g., as described with regard to FIG. 4C), a cylindrical array (e.g., as described with regard to FIG. 4D), or any other configuration of antenna elements in an array.

In some embodiments, single channel interferometer 104 includes radio frequency (RF) front end 510 that includes components for processing incoming signals received by antennas 502-508, such as one or more filters, limiters, calibration circuits (e.g., circuits that store phase calibration offsets and/or delay calibration offsets for each antenna output), low noise amplifiers (e.g., applied to each antenna output), and/or downconverters (e.g., for converting antenna output signals to lower frequencies). Components of RF front end 510 may apply the same processing to the outputs of antennas 502-508 and/or different processing to the outputs of antennas 502-508. In some embodiments, low noise amplifiers of RF front end 510 compensate for the losses introduced by optical channels 522-528 and/or other components of single channel interferometer 104.

An RF to optical converter 520 receives RF signals from antennas 502-508 (e.g., as processed by RF front end 510) via channels 512, 514, 516, and 518. RF to optical converter 520 converts analog RF signals into optical signals for transmission via optical channels 522, 524, 526, and 528.

In some embodiments, optical channels 522-528 are optical fiber channels (e.g., optical fiber channels including spooled optical fiber of varying lengths to apply varying delays along the lengths of the channels). The novel use of optical fiber allows delays of $100s$ of nanoseconds or more to be achieved in a very low physical volume if necessitated by the bandwidth of the phase measuring receiver channel. The lengths of optical channels 522-528 are indicated by the increasing number of loops in respective coils indicated in optical channels 522-528. For example, the length of optical channel 528 is greater than the length of optical channel 526, the length of optical channel 526 is greater than the length of optical channel 524, and the length of optical channel 524 is greater than the length of optical channel 522. In some embodiments, optical channels 522, 524, 526, and 528 introduce first, second, third, and fourth delays, respectively, that are proportional to the respective lengths of the channels.

In some embodiments, optical channels are optical waveguides or another physical structure that guides optical spectrum waves.

An optical to RF converter 530 receives optical signals via optical channels 522-528 and converts the optical signals to RF signals. RF signals corresponding to the optical signals carried by optical channels 522, 524, 526, and 528 are output at nodes 532, 534, 536, and 538, respectively, of optical to RF converter 530.

Switch 540 switches between nodes 532, 534, 536, and 538 to serially receive the output of optical to RF converter 530. Typically, delays 522-528 are configured to apply a sufficient delay to allow a rise time associated with the signal at nodes 532-538 to elapse between subsequent switch operations by switch 540 (E.G., as described further below with regard to FIG. 10).

In some embodiments, in lieu of RF to optical converter 520, optical channels 522-528, and optical to RF converter 530, single channel interferometer 104 includes delay lines (e.g., non-optical media delay lines) that apply varying amounts of delay to the antenna output signals, and switch 540 serially detects the output of the delay lines.

In some embodiments, instead of passing through RF to optical converter 520 and optical to RF converter 530 along the path indicated by channels 512 and 522, the signal output of antenna 502 is received at node 532 via an alternate channel indicated by dotted line 542. In some embodiments, alternate channel 542 includes one or more components 544 for gain and/or phase equalization to adjust the gain and/or phase of the signal on channel 542 to match any adjustments to the gain and/or phase introduced along the paths through channels 514-518, RF to optical converter 520, optical channels 524-528, and optical to RF converter 530. In this way, signals received by switch 540 via channel 542 have a phase and/or gain that is meaningfully comparable with signals received by switch 540 at nodes 534, 536, and 538.

Direction finding subsystem 546 serially receives the signal output of nodes 532-538 from switch 540. Direction finding subsystem 546 includes, e.g., a phase measurement receiver 548, as described further below with regard to FIGS. 7-9, that synchronizes the signals received by direction finding subsystem 546 to a common time epoch, e.g., by demultiplexing the signals and/or applying a delay to at least some of the signals in order to compensate for the effects of switch 540 and delays applied by optical channels 522-528. Direction finding module 550 of direction finding subsystem 546 determines a direction of arrival of the signal detected by antennas 502-508 using phase comparison data output of phase measurement receiver 548. In some embodiments, direction finding subsystem 546 includes a frequency and/or time reference source 552 that includes one or more components (e.g., clocks) for: providing an RF signal for phase calibration of one or more components of single channel interferometer 104; and providing timing for synchronizing switch 540, demux switches 702, 802, and 902 of FIGS. 7-9, and/or analog to digital converters (ADCs) 618 of FIGS. 7-9.

Figure 6:
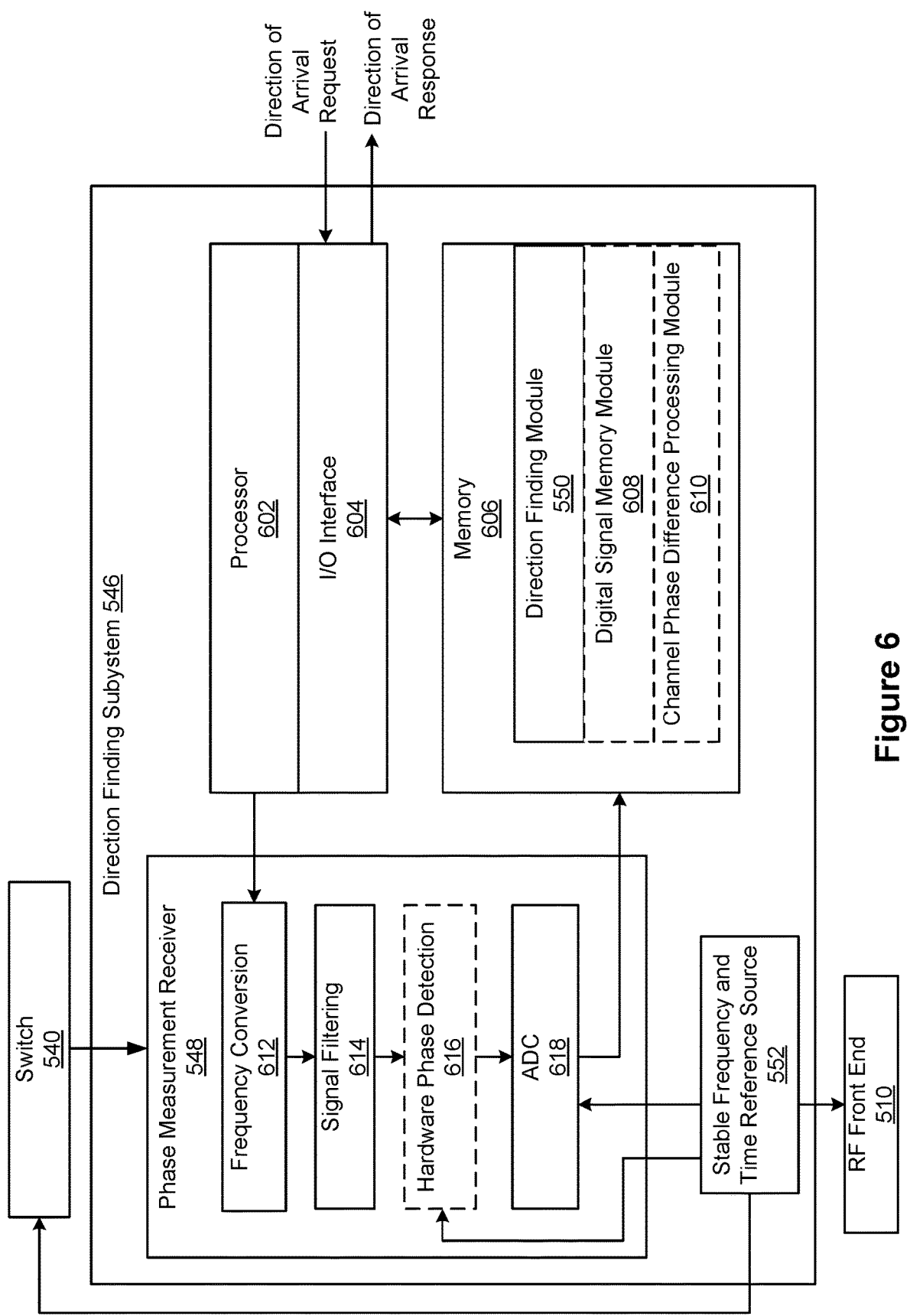
FIG. 6 is a diagram of a direction finding subsystem of a single channel interferometer, in accordance with some embodiments.

FIG. 6 is a diagram of direction finding subsystem 546, in accordance with some embodiments. Direction finding subsystem 546 typically includes one or more processor(s) 602, an input/output (I/O) interface 604, and memory 606. In some embodiments, a communication bus (not shown) is used for interconnecting these components. The communication bus optionally includes circuitry (sometimes called a chipset) that interconnects and controls communications between components of direction finding subsystem 546.

Processor(s) 602 execute modules, programs and/or instructions stored in memory 606 and thereby perform processing operations.

In some embodiments, the memory 606 stores one or more programs (e.g., sets of instructions) and/or data structures, collectively referred to as "modules" herein. In some embodiments, memory 606, or a non-transitory computer readable storage medium of memory 606, stores the following programs, modules, and data structures, or a subset or superset thereof:

Direction finding module 550 for determining a direction of arrival of the signal detected by antennas 502-508 using phase data output of phase measurement receiver 548;

Digital signal memory 608, for storing digitized samples of the output of switch 540, as described further below with regard to FIG. 9; and Channel phase difference processing module 610, which compares data stored by digital signal memory 608 to determine phase data, as described further below with regard to FIG. 9.

The above identified modules (e.g., data structures, and/or programs including sets of instructions) need not be implemented as separate software programs, procedures or modules, and thus various subsets of these modules may be combined or otherwise re-arranged in various embodiments. In some embodiments, memory 606 stores a subset of the modules identified above. Furthermore, the memory 606 may store additional modules not described above. In some embodiments, the modules stored in memory 606, or a non-transitory computer readable storage medium of memory 606, provide instructions for implementing respective operations in the methods described below. In some embodiments, some or all of these modules may be implemented with specialized hardware circuits and/or lookup tables that subsume part or all of the module functionality. One or more of the above identified elements may be executed by one or more of processor(s) 602.

The I/O interface 604 enables communication between direction finding subsystem 546 and devices that are remote from single channel interferometer 104, such as a control system of an aircraft 108, via one or more wired and/or wireless connections. For example, I/O interface 604 receives requests from a remote device for determining a direction of arrival of a signal received by single channel interferometer 104 and/or transmits determined direction of arrival information to a remote device.

Phase measurement receiver 548 includes, e.g., a frequency conversion component 612, a signal filtering component 614, a hardware phase detection component 616, and/or an ADC 618. In some embodiments, frequency conversion component 612 converts the signal output of switch 540 to an intermediate frequency. In some embodiments, signal filtering component 614 includes a filter that is designed to pass signals with frequencies within a frequency range (e.g., such that the filter can be tuned to receive frequencies within the predetermined frequency range and/or the single channel interferometer can tune the filter to lock onto the strongest signal among multiple signals received at various frequencies). The frequency range of signal filtering component 614 is, e.g., a static frequency range and/or an adjustable frequency range (e.g., adjustable in response to user input and/or automatically adjusted). Phase measurement receiver 548 performs phase detection using a hardware-implemented phase detection component 616 and/or a software implemented phase detection component (e.g., of direction finding module 550).

Figure 7:
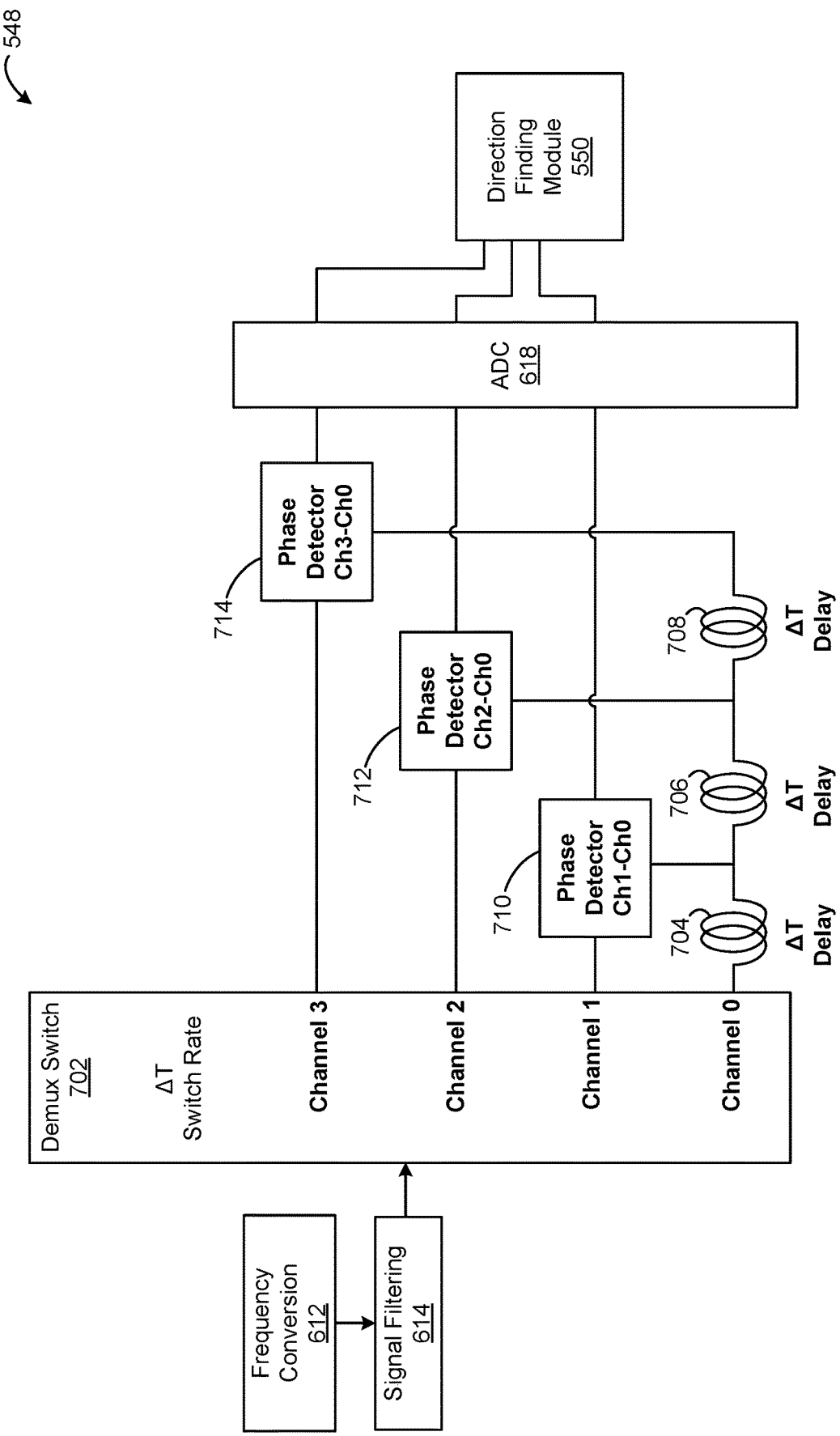
FIG. 7 illustrates a phase measurement receiver, in accordance with some embodiments.

FIG. 7 illustrates a phase measurement receiver 548, in accordance with some embodiments. In some embodiments, a signal received by phase measurement receiver 548 is processed by frequency conversion component 612 and/or signal filtering component 614, e.g., as described with regard to FIG. 6, before arriving at demultiplexer (demux) switch 702. The switch rate ΔT of demux switch 702 is the same as the ΔT dwell time of switch 540. As discussed further above, switch 540 switches from node 532 to node 534, from node 534 to node 536, and from node 536 to 538, to serially output signals corresponding to the signals at nodes 532-538. Demux switch 702 receives the serialized signal and performs switching to output the received signals at the outputs indicated by "Channel 0," which corresponds to the output of node 532; "Channel 1," which corresponds to the output of node 534; "Channel 2," which corresponds to the output of node 536; and "Channel 3," which corresponds to the output of node 538.

Delays 704, 706, and 708 are delays that delay a signal by an amount of time (e.g., by a time ΔT that is equal to the ΔT dwell time of demux switch 702 and switch 540). In some embodiments, delays 704, 706, and 708 are analog delays, such as optical fiber delays (e.g., the output of Channel 0 is converted from an RF signal to an optical signal prior to the first optical fiber delay (e.g., 704) and the signal output of the last optical delay (e.g., 708) is converted from an optical signal to an RF signal).

Delay 704 is applied to the signal output of Channel 0. At the output of delay 704, the signal on channel 0 is synchronized to the same time epoch as the signal output of Channel 1 (the relative phase between Channel 1 and Channel 0 is the same as the relative phase between the input detected at antenna 502 and antenna 504, because delay 704 applies the same delay to Channel 0 that as the delay that was applied to Channel 1 by delay 524). Phase detector 710 determines a phase between the Channel 0 signal and the Channel 1 signal. Channel 2 is synchronized to a common time epoch with channel 0 by delay 706, which applies the same delay to Channel 0 as the delay that was applied to Channel 2 by delay 526. Phase detector 712 determines a phase between the Channel 0 signal and the Channel 2 signal. Channel 3 is synchronized to a common time epoch with Channel 0 by delay 710, which applies the same delay to Channel 0 as the delay that was applied to Channel 3 by delay 528. Phase detector 714 determines a phase between the Channel 0 signal and the Channel 3 signal.

In some embodiments, the phases determined by phase detectors 710, 712, and 714 are converted from analog signals to digital signals by ADC 618. Direction finding module 550 uses the phases determined by phase detectors 710, 712, and 714 to determine a direction of arrival of the signal detected by antennas 502-508 (e.g., as discussed further below with regard to FIG. 10).

Figure 8:
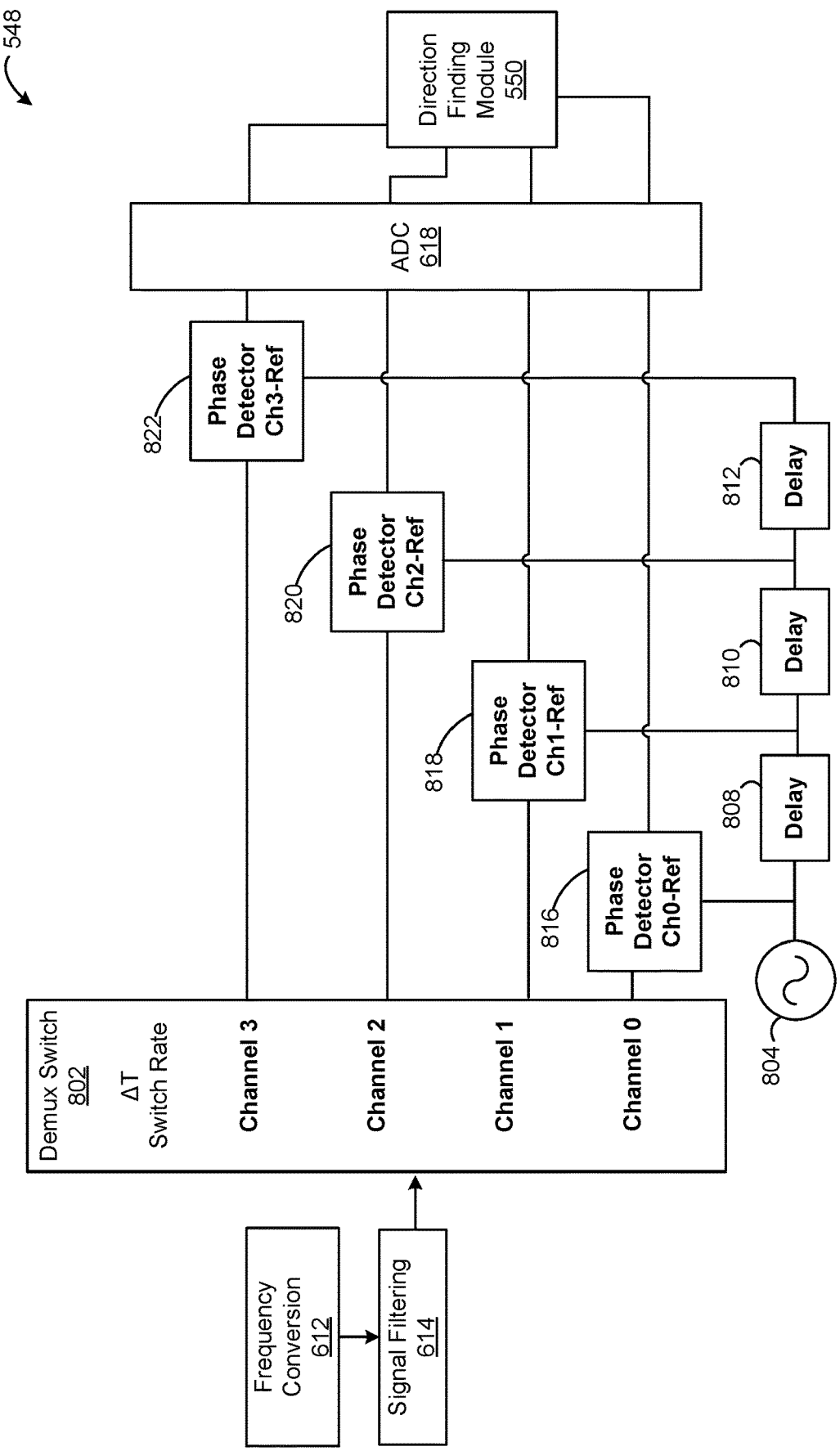
FIG. 8 illustrates a phase measurement receiver that uses a reference signal generator for phase detection, in accordance with some embodiments.

FIG. 8 illustrates a phase measurement receiver 548 that uses a reference signal generator 804 (e.g., an oscillator) for phase detection, in accordance with some embodiments. A demux switch 802 receives the serialized signal from switch 540 (e.g., as processed by frequency conversion component 612 and/or signal filtering component 614), and performs switching to output the received signals at the outputs indicated by "Channel 0," which corresponds to the output of node 532; "Channel 1," which corresponds to the output of node 534; "Channel 2," which corresponds to the output of node 536; and "Channel 3," which corresponds to the output of node 538. The frequency set-on accuracy between the reference signal generator and the received signal frequency becomes increasingly demanding as the channel dwell time ΔT of the multiplexer switch 540 is increased.

In FIG. 8, the signal outputs of Channel 0, Channel 1, Channel 2, and Channel 3 are compared with a reference signal generated by reference signal generator 804. While this embodiment requires a very accurate set-on of the reference signal to the received RF signal frequency; it facilitates the use of digital time delays of the reference signal which can be more compact and lower cost compared to analog time delays.

Delays 808, 810, and 812 delay the reference generator signal generated by reference signal generator 804 by an amount of time ΔT (e.g., that is equal to the ΔT dwell time of demux switch 802 and switch 540). In some embodiments, delays 808, 810, and 812 are analog delays, such as optical fiber delays, and/or digital delays.

Phase detector 816 determines a phase between the Channel 0 signal and the reference signal output of reference signal generator 804. A delay 808 applies a first delay to the signal output of the reference signal generator 804. Phase detector 818 determines a phase between the Channel 1 signal and the reference signal from 804 as delayed by delay 808. A delay 810 applies a second delay to the signal output of the reference signal generator 804. Phase detector 820 determines a phase between the Channel 2 signal and the reference signal from 804 as delayed by delay 808 and delay 810. A delay 812 applies a third delay to the signal output of the reference signal generator 804. Phase detector 822 determines a phase between the Channel 3 signal and the reference signal from 804 as delayed by delays 808, 810, and 812.

In some embodiments, the phases determined by phase detectors 816, 818, 820, and 822 are converted from analog signals to digital signals by ADC 618. Direction finding module 550 uses the phases determined by phase detectors 816, 818, 820 and 822 to determine a direction of arrival of the signal detected by antennas 502-508 (e.g., as discussed further below with regard to FIG. 10).

Figure 9:
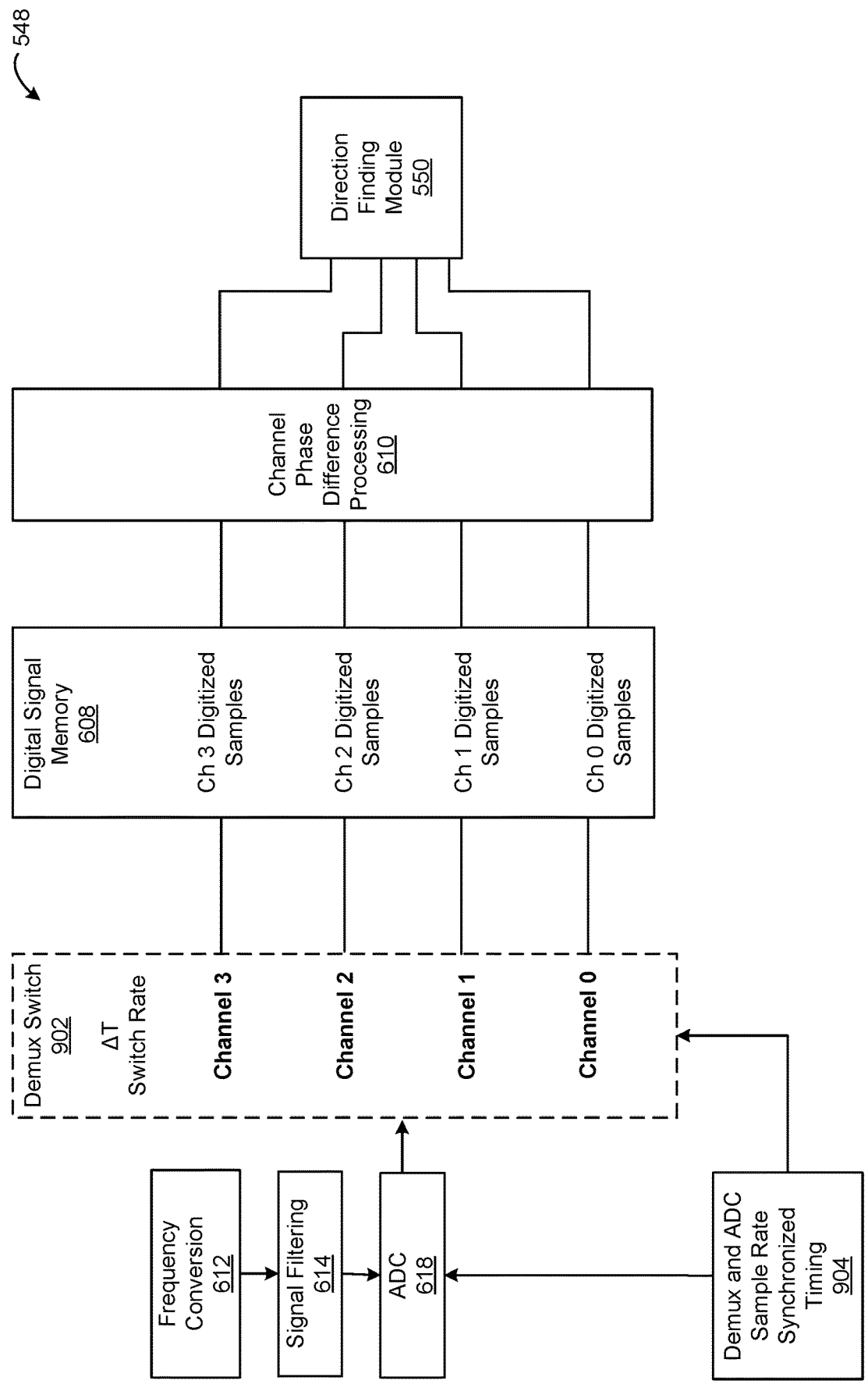
FIG. 9 illustrates a phase measurement receiver that uses a digital signal memory for channel synchronization, in accordance with some embodiments.
Figure 10A:
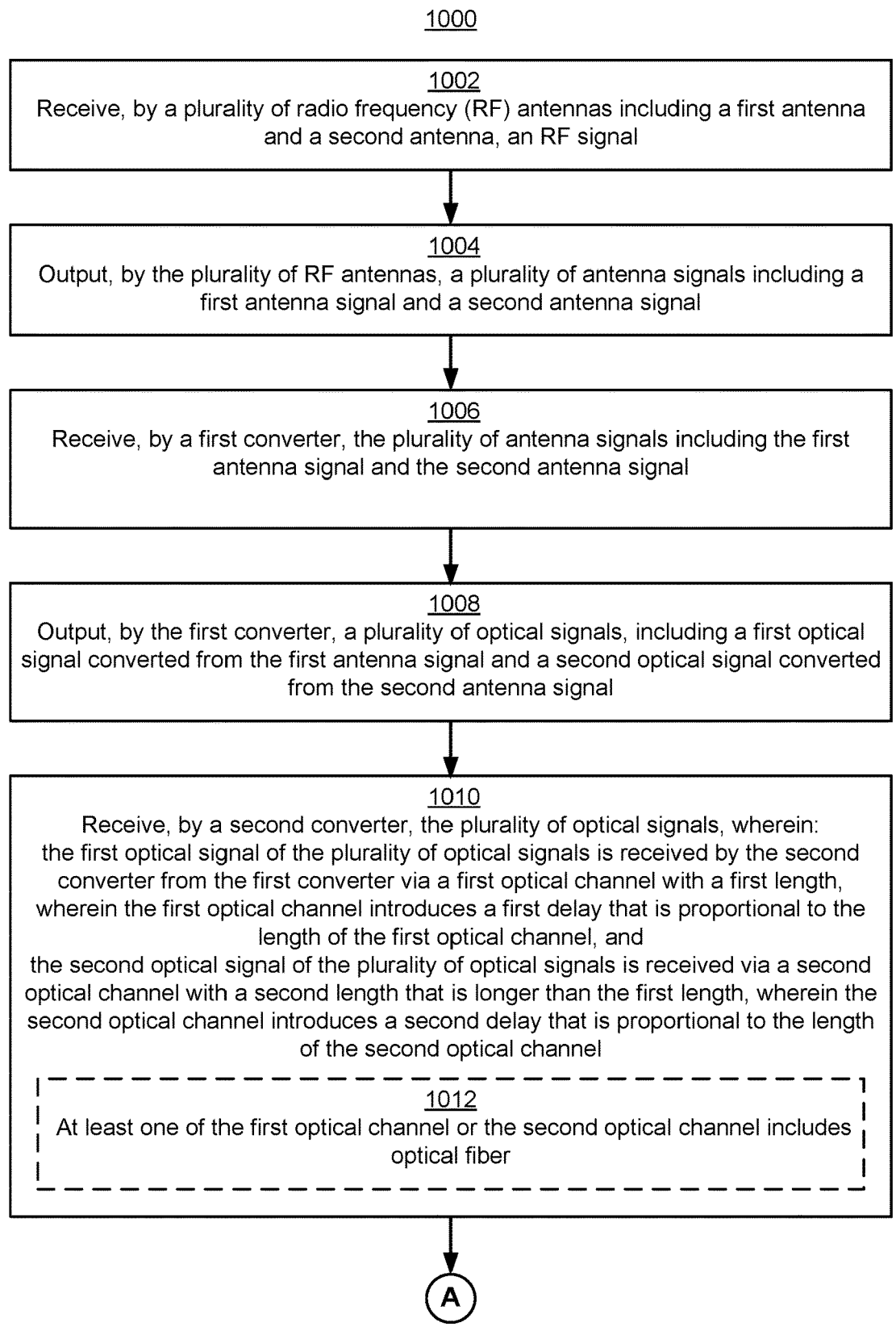
Figure 10B:
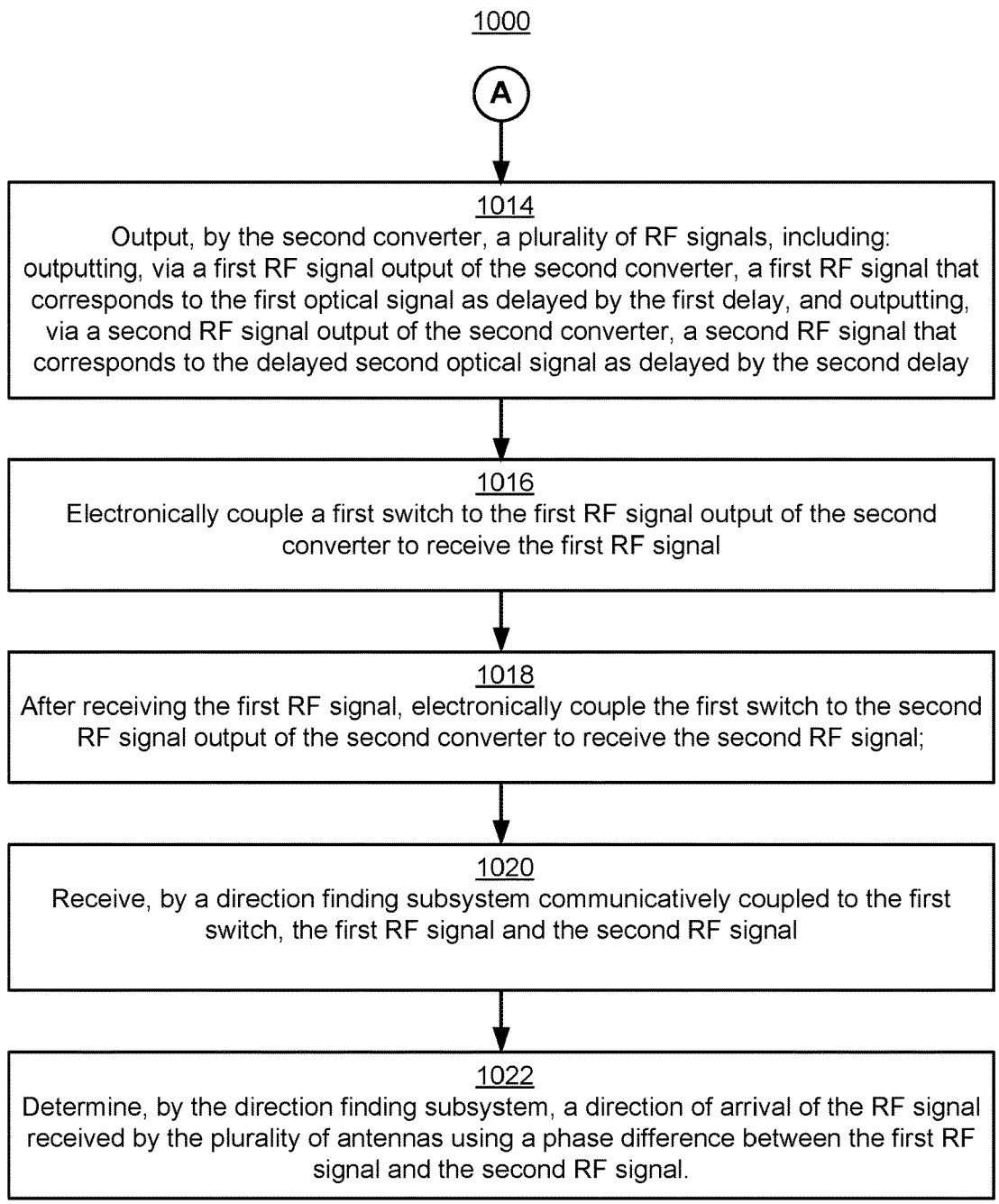
Figure 10C:
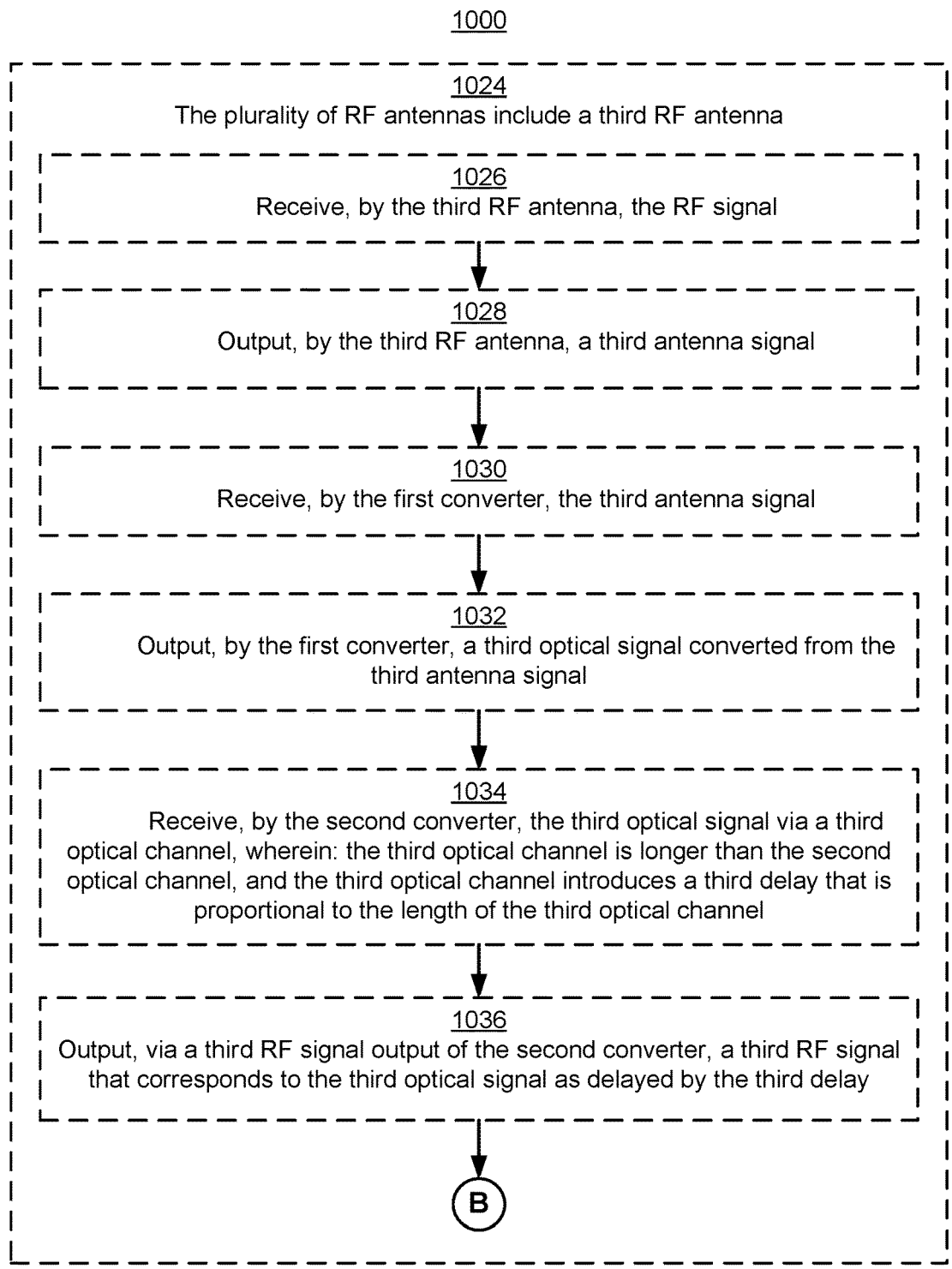
Figure 10D:
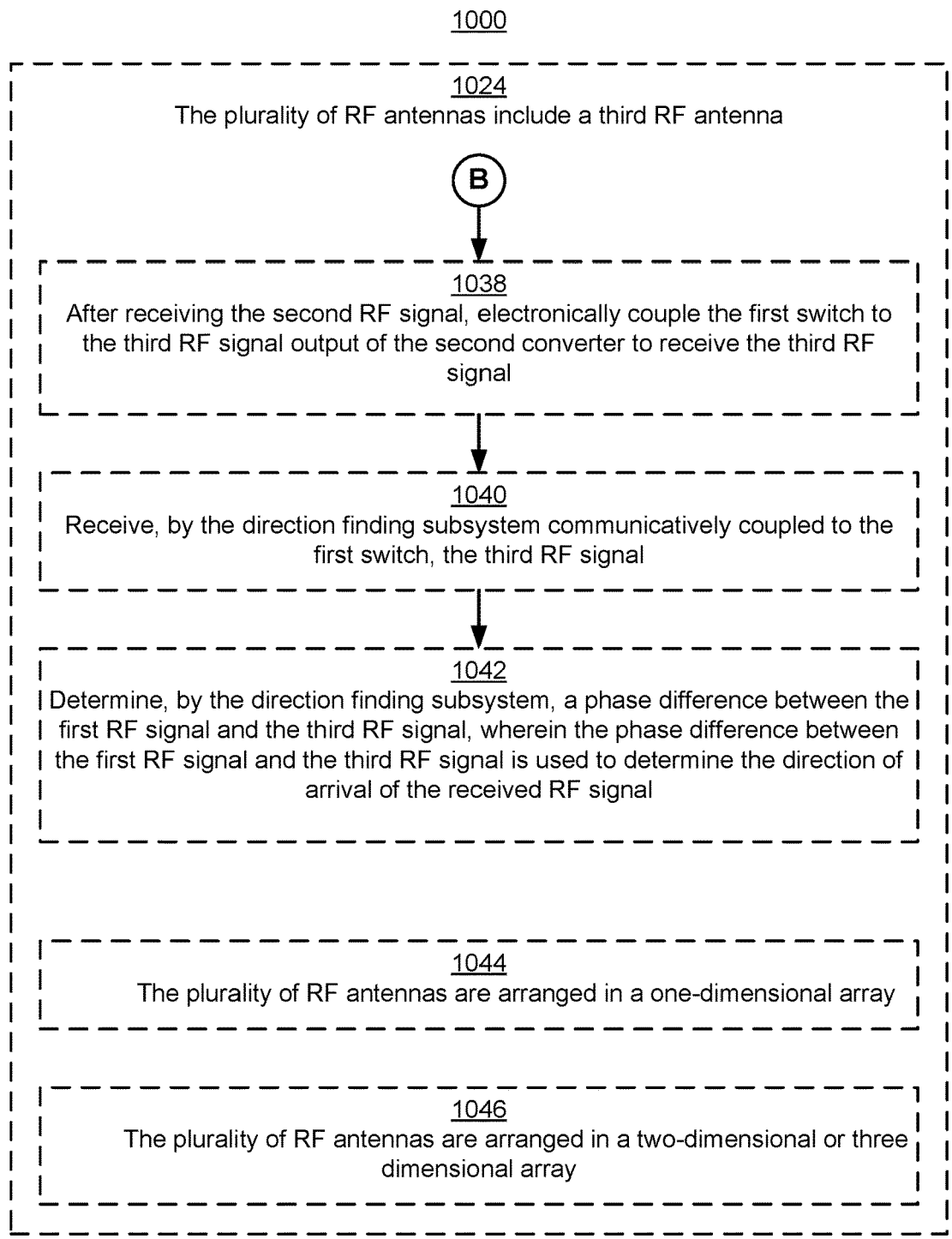

FIG. 9 illustrates a phase measurement receiver 548 that uses a digital signal memory 608 for channel synchronization, in accordance with some embodiments. In some embodiments, a demux switch 902 receives the serialized signal from switch 540. In some embodiments, the serialized signal from switch 540 is processed by frequency conversion component 612, signal filtering component 614 (which may include I/Q decomposition), and/or one or more ADCs 618 (e.g., an I component ADC and a Q component ADC). The demux switch 902 performs switching to output the received signals in parallel at the outputs indicated by "Channel 0," which corresponds to the output of node 532; "Channel 1," which corresponds to the output of node 534; "Channel 2," which corresponds to the output of node 536; and "Channel 3," which corresponds to the output of node 538. In some embodiments, a timing device 904 (e.g., frequency and/or time reference source 552) provides synchronized timing for demux switch 902 and ADC 618.

In FIG. 9, the signal outputs of switch 540 (and, when demux 902 is used, of demux 902) are stored to digital signal memory 608, such that the signals are synchronized to a common time epoch as Channel 0 digitized samples, Channel 1 digitized samples, Channel 2 digitized samples, and Channel 3 digitized samples. A phase difference processing device 610 determines a phase between the Channel 1 digitized samples and the Channel 0 digitized samples, a phase between the Channel 2 digitized samples and the Channel 1 digitized samples, and a phase between the Channel 3 digitized samples and the Channel 2 digitized samples. The determined phases are received by direction finding module 550 from channel phase difference processing module 610. Direction finding module 550 uses the phases determined by channel phase difference processing module 610 to determine a direction of arrival of the signal detected by antennas 502-508 (e.g., as described below with regard to FIG. 10).

While FIGS. 5-9 describe an interferometer 104 that includes four antennas and phase determination based on the signal as detected by the four antennas, it will be recognized that interferometer 104 may include other numbers of antennas. For example, an interferometer 104 that includes six antennas will produce six channels of data that can be used to determine five phase difference values (e.g., using a phase measurement receiver 548 as described with regard to FIG. 7 or 9) or six phase difference values (e.g., using a phase measurement receiver with a reference source generator 804 as described with regard to FIG. 8).

FIGS. 10A-10F are flow diagrams illustrating a method 1000 for determining a direction of arrival of an RF signal, in accordance with some embodiments. The method 1000 is performed at a device, such as single channel interferometer 104. In some embodiments, at least some of the instructions for performing the method 1000 (e.g., as described with regard to operation 1022 below) are stored in the memory 606 and executed by processor 602.

The device receives (1002), by a plurality of radio frequency (RF) antennas (e.g., N antennas) including a first antenna (e.g., antenna 502) and a second antenna (e.g., antenna 504), an RF signal (e.g., an RF signal transmitted by a signal transmitter 102).

The device outputs (1004), by the plurality of RF antennas, a plurality of antenna signals including a first antenna signal (e.g., via channel 512) and a second antenna signal (e.g., via channel 514).

The device receives (1006), by a first converter (e.g., RF to optical converter 520), the plurality of antenna signals including the first antenna signal and the second antenna signal.

The device outputs (1008), by the first converter (e.g., RF to optical converter 520), a plurality of optical signals, including a first optical signal converted from the first antenna signal and a second optical signal converted from the second antenna signal. For example, the first optical signal is output via optical channel 522 and the second optical signal is output via optical channel 524.

The device receives (1010), by a second converter (e.g., optical to RF converter 530), the plurality of optical signals. The first optical signal of the plurality of optical signals is received by the second converter from the first converter via a first optical channel (e.g., 522) with a first length. The first optical channel introduces a first delay that is proportional to the length of the first optical channel. The second optical signal of the plurality of optical signals is received via a second optical channel (e.g., 524) with a second length that is longer than the first length. The second optical channel introduces a second delay that is proportional to the length of the second optical channel. In some embodiments (1012), at least one of the first optical channel or the second optical channel includes optical fiber. For example, optical channel 524 includes a length of optical fiber (such as optical fiber that includes a spool of optical fiber configured to apply a predetermined delay) that is longer than a length of optical fiber of optical channel 522.

The device outputs (1014), by the second converter (e.g., optical to RF converter 530), a plurality of RF signals. The device outputs, via a first RF signal output of the second converter 530 (e.g., at node 532), a first RF signal that corresponds to the first optical signal as delayed by the first delay. The device outputs (1014), via a second RF signal output of the second converter 530 (e.g., at node 534), a second RF signal that corresponds to the delayed second optical signal as delayed by the second delay.

In some embodiments, the device electronically couples (1016) a first switch 540 to the first RF signal output of the second converter 530 (e.g., optical to RF converter 530), for example, at node 532, to receive the first RF signal. After receiving the first RF signal, the device electronically couples (1018) the first switch 540 to the second RF signal output of the second converter (e.g., optical to RF converter 530), for example, at node 534, to receive the second RF signal. In some embodiments, the switch is a multiplexer, such as a single pole, N throw switch that operates at a switching speed equal to the time delay between the antenna channels. In some embodiments, the switch 540 is a commutating switch.

The device receives (1020), by a direction finding subsystem 546 that is communicatively coupled to the first switch 540, the first RF signal and the second RF signal. In some embodiments, direction finding subsystem 546 uses phase measurement receiver 548 to synchronize the first RF signal and the second RF signal to a common time epoch. Because of the unequal electrical path length seen by the first RF signal and the second RF signal, there is a difference in phase caused solely by the delay lines (e.g., 522-528) that requires correction in the direction finding processing. For example, phase measurement receiver 548 includes a demultiplexing switch (e.g., 702, 802, 902) to deserialize the first RF signal and the second RF signal received from first switch 540, and applies a delay to at least one of the first RF signal and the second RF signal by analog and/or digital means (e.g., as described with regard to FIGS. 7-9).

The device determines (1022), by the direction finding subsystem 546, a direction of arrival of the RF signal received by the plurality of antennas using a phase difference between the first RF signal and the second RF signal (e.g., as corrected by the phase measurement receiver 548 as described with regard to FIGS. 7-9, for example, by delays applied to one or more channels). For example, direction finding subsystem 546 uses a lookup table (e.g., stored in hardware or software) to determine a direction of arrival based on at least the phase difference between the first RF signal and the second RF signal. In some embodiments, interferometer 104 includes more than two antennas, and the direction or arrival is determined using the phase difference between the first RF signal and the second RF signal, a phase difference between the first RF signal and a third RF signal, and so on. In some embodiments, a direction finding subsystem 546 of interferometer 104 includes a reference signal generator 804, and a phase is determined between the reference signal and one or more channels corresponding to antennas of the interferometer. In some embodiments, the direction of arrival is determined, using the following formula:

$$\cos(\Phi) = \Delta(\psi) * \frac{\lambda}{2\pi d}$$

where $\Phi$=angle of arrival, d=distance between adjacent antennas, $2\pi/\lambda$=a free space propagation constant and $\Delta\psi$=antenna-to-antenna phase angle. Well known interferometry calculations based on various arrangements of antennas are used to determine the direction of arrival using multiple phase determinations.

In some embodiments (1024), the plurality of RF antennas include a third RF antenna (e.g., 506). The device receives (1026), by the third RF antenna, the RF signal (e.g., from the signal transmitter 102). The device outputs (1028), by the third RF antenna (e.g., 506), a third antenna signal (e.g., via channel 516). The device receives (1030), by the first converter (e.g., RF to optical converter 520), via channel 516, the third antenna signal. The device outputs (1032), by the first converter (e.g., RF to optical converter 520), a third optical signal converted from the third antenna signal. The device receives (1034), by the second converter (e.g., optical to RF converter 530), the third optical signal via a third optical channel (e.g., optical channel 526). The third optical channel 526 is longer than the second optical channel 524. For example, the third optical channel includes a length of optical fiber (e.g., including a spool of optical fiber) that is longer than the length of optical fiber along channel 524. The third optical channel introduces a third delay that is proportional to the length of the third optical channel (e.g., the delay introduced by optical channel 526 is longer than the delay introduced by optical channel 524). The device outputs (1036), via a third RF signal output of the second converter (e.g., optical to RF converter 530), at node 536, a third RF signal that corresponds to the third optical signal as delayed by the third delay. After receiving the second RF signal, the device electronically couples (1038) the first switch 540 to the third RF signal output of the second converter (e.g., optical to RF converter 530), at node 536, to receive the third RF signal. The device receives (1040), by the direction finding subsystem 546, the third RF signal from electronic switch 540 (after receiving the first RF signal and the second RF signal). In some embodiments, direction finding subsystem 546 uses phase measurement receiver 548 to synchronize the first RF signal, the second RF signal, and the third RF signal to a common time epoch. For example, phase measurement receiver 548 includes a demultiplexing switch (e.g., 702, 802, 902) to deserialize the first RF signal, the second RF signal, and the third RF signal received from first switch 540, and applies a delay to at least one of the first RF signal and the second RF signal by analog and/or digital means (e.g., as described with regard to FIGS. 7-9). The device determines (1042), by the direction finding subsystem 546, a phase difference between the first RF signal and the third RF signal. The phase difference between the first RF signal and the third RF signal is used (e.g., in addition to the phase difference between the first RF signal and the second RF signal, as discussed with regard to operation 1022) to determine the direction of arrival of the received RF signal.

In some embodiments (1044), the plurality of RF antennas are arranged in a one-dimensional array (e.g., as illustrated by linear array 104a of FIG. 4A).

In some embodiments (1046), the plurality of RF antennas are arranged in a two-dimensional array (e.g., as illustrated by planar array 104b of FIG. 4B or circular array 104c of FIG. 4C) or a three dimensional array (e.g., as illustrated by cylindrical array 104d of FIG. 4D).

In some embodiments (1048), electronically coupling the first switch 540 to the second RF signal output (e.g., node 534) of the second converter 530 to receive the second RF signal occurs a predetermined amount of time ($\Delta T$) after electronically coupling the first switch to the first RF signal output (e.g., node 532) of the second converter 530 to receive the first RF signal. In some embodiments, switch 540 has a switching rate of e.g., 1 ns-1000 ns, such as 200 ns. For example, when $\Delta T$ (e.g., 200 ns) has elapsed after first switch 540 electronically couples to node 532, first switch 540 electronically couples to node 534; when $\Delta T$ (e.g., 200 ns) has elapsed after first switch 540 electronically couples to node 534, first switch 540 electronically couples to node 536; and when $\Delta T$ (e.g., 200 ns) has elapsed after first switch 540 electronically couples to node 536, first switch 540 electronically couples to node 538.

In some embodiments, the device receives (1050), by a second switch (e.g., demultiplexer switch 702, 802, or 902) that is communicatively coupled to the direction finding subsystem 546, the first RF signal. For example, demultiplexer switch (702, 802, 902) is a switch that switches at the same switching rate as first switch 540. The device outputs (1052), by the second switch (702, 802, 902), the first RF signal. After the predetermined amount of time ($\Delta T$), the device receives (1054), by the second switch (702, 802, 902), the second RF signal (e.g., from switch 540). The device outputs (1056), by the second switch (702, 802, 902), the second RF signal.

In some embodiments, the device applies (1058), by a delay device (e.g., 704 or 608), a delay to the first RF signal. In some embodiments, the delay device includes (1060) optical fiber (e.g., as shown at 704).

In some embodiments, the device applies (1062), by a delay device (e.g., 808), a delay to a reference signal generated by a reference signal generator 804. Delay device 808 is, e.g., an analog delay device, such as an optical fiber delay, and/or a digital delay device. The phase difference between the first RF signal and the second RF signal is determined using: a phase difference between the first RF signal and the reference signal (e.g., by phase detector 816), and a phase difference between the second RF signal and the delayed reference signal (e.g., by phase detector 818). In some embodiments, the reference signal generator 804 is configured to initiate a waveform each time the demux switch 802 switches.

In some embodiments, the device stores (1064), by a memory device (e.g., digital signal memory 608), a digitized representation of the first RF signal output of the second switch (e.g., Channel 0 of demux switch 902) and the device stores, by the digital signal memory 608, a digitized representation of the second RF signal output of the second switch (e.g., Channel 1 of demux switch 902), wherein a digital delay is applied to the second RF signal stored by digital signal memory 608.

Figure 11B:
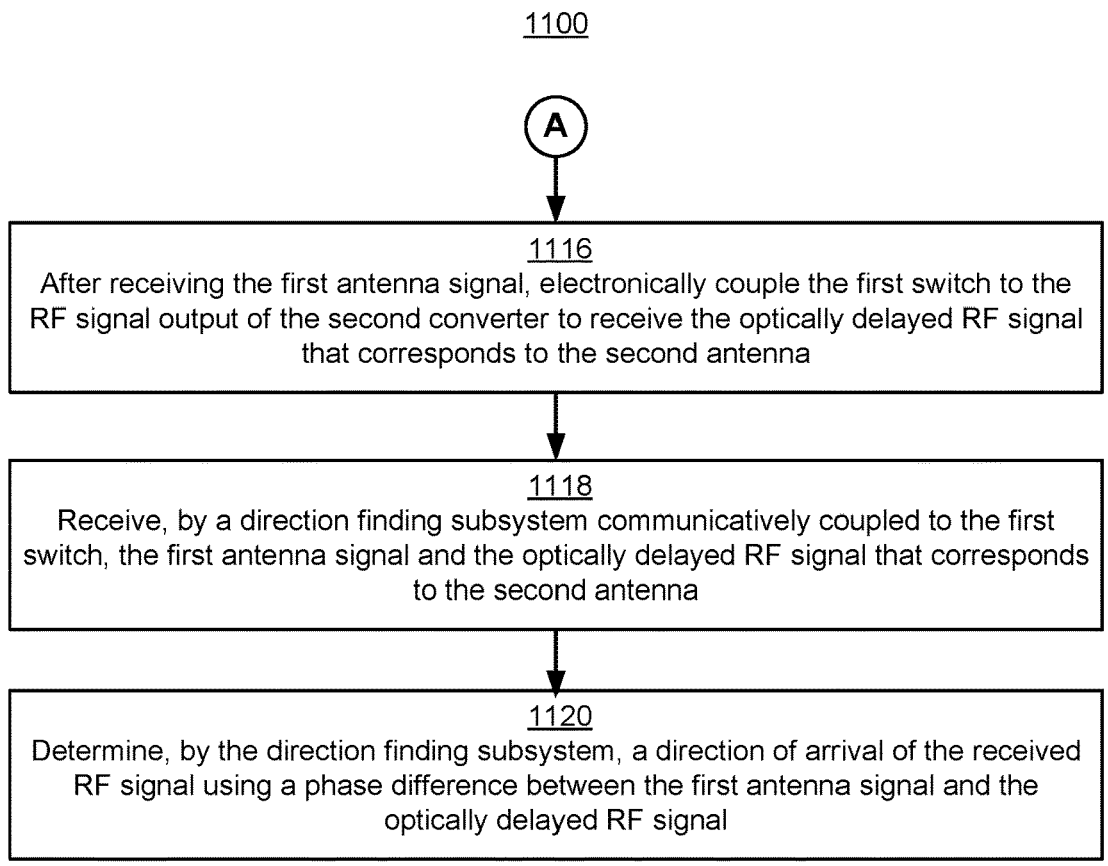

FIGS. 11A-11B are flow diagrams illustrating a method 1100 for determining a direction of arrival of an RF signal, in accordance with some embodiments. The method 1100 is performed at a device, such as single channel interferometer 104. In some embodiments, at least some of the instructions for performing the method 1100 (e.g., as described with regard to operation 1120 below) are stored in the memory 606 and executed by processor 602.

In some embodiments, a device for determining a direction of arrival of an RF signal includes receiving (1102), by a plurality of radio frequency RF antennas including a first antenna and (e.g., 502) a second antenna (e.g., 504), an RF signal.

The device outputs (1104), by the plurality of RF antennas (e.g., 502 and 504), a plurality of antenna signals including a first antenna signal (e.g., via channel 542) and a second antenna signal (e.g., via channel 514).

The device receives (1106), by a first converter (e.g., RF to optical converter 520) that is electrically coupled to the plurality of RF antennas, the second antenna signal.

The device outputs (1108), by the first converter (e.g., RF to optical converter 520), an optical signal converted from the second antenna signal (e.g., via optical channel 524).

The device receives (1110), by a second converter (e.g., optical to RF converter 530), the optical signal, wherein the optical signal is received via an optical channel (e.g., optical channel 524) that introduces a delay proportional to the length of the optical channel. For example, the optical channel is an optical fiber channel (e.g., including a spool of optical fiber).

The device outputs (1112), by an RF signal output of the second converter (e.g., optical to RF converter 530), an optically delayed RF signal that corresponds to the second antenna 504 (e.g., at node 534).

The device electronically couples (1114) a first switch 540 to a first output of the first antenna to receive the first antenna signal (e.g., at node 532). In some embodiments, a gain and/or phase matching adjustment is applied to the first antenna signal by gain and/or phase equalization component 544 (e.g., as described with regard to FIG. 5) between the output of first antenna 502 and node 532.

After receiving the first antenna signal, the device electronically couples (1116) the first switch 540 to the RF signal output of the second converter 530 (e.g., at node 534) to receive the optically delayed RF signal that corresponds to the second antenna 504.

The device receives (1118), by a direction finding subsystem 546 communicatively coupled to the first switch 540, the first antenna signal and the optically delayed RF signal that corresponds to the second antenna. In some embodiments, phase measurement receiver 548 of direction finding subsystem 546 synchronizes the signals received by direction finding subsystem 546 to a common time epoch, e.g., by demultiplexing and delaying the signals to reverse the effects of switch 540 and the delay applied by optical channel 524 and/or gain and/or phase equalization component 544.

The device determines (1120), by the direction finding subsystem, a direction of arrival of the received RF signal using a phase difference between the first antenna signal and the optically delayed RF signal.

In some embodiments, features of the present invention can be implemented in, using, or with the assistance of a computer program product, such as a storage medium (media) or computer readable storage medium (media) having instructions stored thereon/in which can be used to program a processing system to perform any of the features presented herein. The storage medium (e.g., memory 606) can include, but is not limited to, high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. Memory 606 optionally includes one or more storage devices remotely located from the CPU(s) 602. Memory 606, or alternatively the non-volatile memory device(s) within memory 606, comprises a non-transitory computer readable storage medium.

Stored on any one of the machine readable medium (media), features of the present invention can be incorporated in software and/or firmware for controlling the hardware of a processing system, and for enabling a processing system to interact with other mechanism utilizing the results of the present invention. Such software or firmware may include, but is not limited to, application code, device drivers, operating systems, and execution environments/containers.

It will be understood that, although the terms "first," "second," etc. may be used herein to describe various elements, these elements should not be limited by these terms. These terms are only used to distinguish one element from another.

The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific embodiments. However, the illustrative discussions above are not intended to be exhaustive or to limit the claims to the precise forms disclosed. Many modifications and variations are possible in view of the above teachings. The embodiments were chosen and described in order to best explain principles of operation and practical applications, to thereby enable others skilled in the art.

What is claimed is:

1. A method for determining a direction of arrival of a radio frequency (RF) signal, the method including:
   receiving, by a plurality of radio frequency (RF) antennas including a first antenna and a second antenna, an RF signal;
   outputting, by the plurality of RF antennas, a plurality of antenna signals including a first antenna signal and a second antenna signal;
   receiving, by a first converter, the plurality of antenna signals including the first antenna signal and the second antenna signal;
   outputting, by the first converter, a plurality of optical signals, including a first optical signal converted from the first antenna signal and a second optical signal converted from the second antenna signal;
   receiving, by a second converter, the plurality of optical signals, wherein:
      the first optical signal of the plurality of optical signals is received by the second converter from the first converter via a first optical channel with a first length, wherein the first optical channel introduces a first delay that is proportional to the length of the first optical channel, and
      the second optical signal of the plurality of optical signals is received via a second optical channel with a second length that is longer than the first length, wherein the second optical channel introduces a second delay that is proportional to the length of the second optical channel;

outputting, by the second converter, a plurality of RF signals, including:
 outputting, via a first RF signal output of the second converter, a first RF signal that corresponds to the first optical signal as delayed by the first delay, and
 outputting, via a second RF signal output of the second converter, a second RF signal that corresponds to the second optical signal as delayed by the second delay;

electronically coupling a first switch to the first RF signal output of the second converter to receive the first RF signal;

after receiving the first RF signal, electronically coupling the first switch to the second RF signal output of the second converter to receive the second RF signal;

receiving, by a direction finding subsystem communicatively coupled to the first switch, the first RF signal and the second RF signal; and determining, by the direction finding subsystem, a direction of arrival of the RF signal received by the plurality of antennas using a phase difference between the first RF signal and the second RF signal.

2. The method of claim 1, wherein at least one of the first optical channel or the second optical channel includes optical fiber.

3. The method of claim 1, wherein the plurality of RF antennas include a third RF antenna, and the method includes:
 receiving, by the third RF antenna, the RF signal;
 outputting, by the third RF antenna, a third antenna signal;
 receiving, by the first converter, the third antenna signal;
 outputting, by the first converter, a third optical signal converted from the third antenna signal;
 receiving, by the second converter, the third optical signal via a third optical channel, wherein:
  the third optical channel is longer than the second optical channel, and
  the third optical channel introduces a third delay that is proportional to the length of the third optical channel;
 outputting, via a third RF signal output of the second converter, a third RF signal that corresponds to the third optical signal as delayed by the third delay;
 after receiving the second RF signal, electronically coupling the first switch to the third RF signal output of the second converter to receive the third RF signal;
 receiving, by a direction finding subsystem communicatively coupled to the first switch, the third RF signal; and
 determining, by the direction finding subsystem, a phase difference between the first RF signal and the third RF signal, wherein the phase difference between the first RF signal and the third RF signal and the phase difference between the first RF signal and the third RF signal are used to determine the direction of arrival of the received RF signal.

4. The method of claim 3, wherein the plurality of RF antennas are arranged in a one-dimensional array.

5. The method of claim 3, wherein the plurality of RF antennas are arranged in a two-dimensional or three dimensional array.

6. The method of claim 1, wherein electronically coupling the first switch to the second RF signal output of the second converter to receive the second RF signal occurs a predetermined amount of time after electronically coupling the first switch to the first RF signal output of the second converter to receive the first RF signal.

7. The method of claim 6, including:
 receiving, by a second switch that is communicatively coupled to the direction finding subsystem, the first RF signal;
 outputting, by the second switch, the first RF signal;
 after the predetermined amount of time, receiving, by the second switch, the second RF signal; and
 outputting, by the second switch, the second RF signal.

8. The method of claim 7, including applying, by a delay device, a delay to the first RF signal.

9. The method of claim 8, wherein the delay device includes optical fiber.

10. The method of claim 7, including:
 applying, by a digital delay device, a delay to a reference signal generated by a reference signal generator; and
 wherein the phase difference between the first RF signal and the second RF signal is determined using:
  a phase difference between the first RF signal and the reference signal, and
  a phase difference between the second RF signal and the delayed reference signal.

11. The method of claim 7, including:
 storing, by a memory device, a digitized representation of the first RF signal output of the second switch; and
 storing, by the memory device, a digitized representation of the second RF signal output of the second switch, wherein a digital delay is applied to the second RF signal stored by the memory device.

12. An interferometer, comprising:
 a plurality of radio frequency (RF) antennas including a first antenna and a second antenna, the plurality of RF antennas configured to receive an RF signal and output a plurality of antenna signals including a first antenna signal output by the first antenna and a second antenna signal output by the second antenna;
 a first converter configured to receive the plurality of antenna signals including the first antenna signal and the second antenna signal and output a plurality of optical signals including a first optical signal converted from the first antenna signal and a second optical signal converted from the second antenna signal;
 a second converter configured to receive the plurality of optical signals and output a plurality of RF signals including a first RF signal that corresponds to the first optical signal and a second RF signal that corresponds to the second optical signal;
 a first optical channel that is optically coupled to the first converter and the second converter, wherein the first optical channel:
  has a first length, and
  introduces a first delay that is proportional to the first length of the first optical channel;
 a second optical channel that is optically coupled to the first converter and the second converter, wherein the second optical channel:
  has a second length that is longer than the first length, and
  introduces a second delay that is proportional to the length of the second optical channel;
 a first switch configured to:
  electronically couple to a first RF signal output of the second converter to receive the first RF signal, and after receiving the first RF signal, electronically couple to the second RF signal output of the second converter to receive the second RF signal; and a direction finding subsystem communicatively coupled to the output of the first switch, the direction finding subsystem configured to:

receive the first RF signal and the second RF signal, and determine a direction of arrival of the RF signal received by the plurality of antennas using a phase difference between the first RF signal and the second RF signal.

13. The interferometer of claim 12, wherein at least one of the first optical channel or the second optical channel includes optical fiber.

14. The interferometer of claim 12, wherein:

the plurality of RF antennas include a third RF antenna that is configured to receive the RF signal and output a third antenna signal, the first converter is configured to receive the third antenna signal and output a third optical signal converted from the third antenna signal;

the second converter receives the third optical signal via a third optical channel, wherein:

the third optical channel is longer than the second optical channel, and the third optical channel introduces a third delay that is proportional to the length of the third optical channel;

the second converter outputs a third RF signal that corresponds to the third optical signal as delayed by the third delay;

after receiving the second RF signal, the first switch receives the third RF signal by electronically coupling the first switch to a third RF signal output of the second converter;

the direction finding subsystem receives the third RF signal; and the direction finding subsystem uses a phase difference between the first RF signal and the third RF signal and the phase difference between the first RF signal and the third RF signal to determine the direction of arrival of the received RF signal.

15. The interferometer of claim 14, wherein the plurality of RF antennas are arranged in a one-dimensional array.

16. The interferometer of claim 14, wherein the plurality of RF antennas are arranged in a two-dimensional array or three-dimensional.

17. The interferometer of claim 12, wherein electronically coupling the first switch to the second RF signal output of the second converter to receive the second RF signal occurs a predetermined amount of time after electronically coupling the first switch to the first RF signal output of the second converter to receive the first RF signal.

18. The interferometer of claim 17, including a second switch communicatively coupled to the direction finding subsystem, wherein the second switch is configured to:

receive the first RF signal;
output the first RF signal;
receive the second RF signal; and
after the predetermined amount of time, output the second RF signal.

19. The interferometer of claim 18, including a delay device configured to apply a delay to the first RF signal.

20. The interferometer of claim 19, wherein the delay device includes optical fiber.

21. The interferometer of claim 18, including:

a reference signal generator configured to generate a reference signal; and a digital delay device configured to apply a delay to the reference signal;

wherein the phase difference between the first RF signal and the second RF signal is determined using:

a phase difference between the first RF signal and the reference signal, and a phase difference between the second RF signal and the delayed reference signal.

22. The interferometer of claim 18, including a memory device configured to store a digitized representation of the first RF signal output of the second switch; and wherein:

the memory device stores a digitized representation of the second RF signal output of the second switch; and a digital delay is applied to the second RF signal stored by the memory device.

23. A method for determining a direction of arrival of a radio frequency (RF) signal, the method including:

receiving, by a plurality of radio frequency (RF) antennas including a first antenna and a second antenna, an RF signal;

outputting, by the plurality of RF antennas, a plurality of antenna signals including a first antenna signal and a second antenna signal;

receiving, by a first converter that is electrically coupled to the plurality of RF antennas, the second antenna signal;

outputting, by the first converter, an optical signal converted from the second antenna signal;

receiving, by a second converter, the optical signal, wherein the optical signal is received via an optical channel that introduces a delay that is proportional to the length of the optical channel;

outputting, by an RF signal output of the second converter, an optically delayed RF signal that corresponds to the second antenna;

electronically coupling a first switch to a first output of the first antenna to receive the first antenna signal;

after receiving the first antenna signal, electronically coupling the first switch to the RF signal output of the second converter to receive the optically delayed RF signal that corresponds to the second antenna;

receiving, by a direction finding subsystem communicatively coupled to the first switch, the first antenna signal and the optically delayed RF signal that corresponds to the second antenna, and determining, by the direction finding subsystem, a direction of arrival of the received RF signal using a phase difference between the first antenna signal and the optically delayed RF signal.

* * * * *